(12) United States Patent
Peled et al.

(10) Patent No.: US 9,331,342 B2
(45) Date of Patent: May 3, 2016

(54) ELECTROCHEMICAL SYSTEMS AND METHODS OF OPERATING SAME

(75) Inventors: Emanuel Peled, Even Yehuda (IL);
Arnon Blum, Mobile Post Shikmim (IL)

(73) Assignee: RAMOT AT TEL-AVIV UNIVERSITY LTD., Tel Aviv (IL)

(*) Notice: Subject to any disclaimer, the term of this patent is extended or adjusted under 35 U.S.C. 154(b) by 932 days.

(21) Appl. No.: 13/574,232

(22) PCT Filed: Jan. 24, 2011

(86) PCT No.: PCT/IB2011/000101
§ 371 (c)(1),
(2), (4) Date: Jul. 19, 2012

(87) PCT Pub. No.: WO2011/089520
PCT Pub. Date: Jul. 28, 2011

(65) Prior Publication Data
US 2012/0295172 A1 Nov. 22, 2012

Related U.S. Application Data

(60) Provisional application No. 61/297,853, filed on Jan. 25, 2010.

(51) Int. Cl.
*H01M 4/96* (2006.01)
*H01M 4/90* (2006.01)
(Continued)

(52) U.S. Cl.
CPC .............. *H01M 4/96* (2013.01); *H01M 4/9083* (2013.01); *H01M 4/921* (2013.01); *H01M 4/926* (2013.01); *H01M 8/0202* (2013.01); *H01M 8/0258* (2013.01); *H01M 8/0271* (2013.01);
(Continued)

(58) Field of Classification Search
None
See application file for complete search history.

(56) References Cited

U.S. PATENT DOCUMENTS 4,520,081 A 5/1985 Hohne et al.
4,818,637 A 4/1989 Molter et al.
(Continued)

FOREIGN PATENT DOCUMENTS

DE 3334330 A1 4/1985
DE 10342889 A1 8/2004
(Continued)

OTHER PUBLICATIONS

English translation of Japanese Office Action dated Aug. 5, 2014 corresponding to Japanese Patent App. No. JP2012-549438, pp. 4.
(Continued)

*Primary Examiner* — Tracy Dove
(74) *Attorney, Agent, or Firm* — Ohlandt, Greeley, Ruggiero & Perle, L.L.P.

(57) ABSTRACT

This disclosure relates to electrochemical systems, e.g., a combination of an electrical energy source and an electrical energy storage system having a regenerative fuel cell system, that exhibit operational stability in harsh environments, e.g., both charging and discharging reactions in a regenerative fuel cell in the presence of an acid or a mixture of acids, or a halogen ion or a mixture of halogen ions. The electrochemical systems are capable of conducting both hydrogen evolution reactions (HERs) and hydrogen oxidation reactions (HORs) in the same system. The electrochemical systems have low cost, fast response time, and acceptable life and performance. This disclosure also relates to methods of operating the electrochemical systems containing a regenerative fuel cell system.

20 Claims, 3 Drawing Sheets

(51) Int. Cl.
*H01M 4/92* (2006.01)
*H01M 8/02* (2016.01)
*H01M 8/18* (2006.01)

(52) U.S. Cl.
CPC .............. *H01M 8/186* (2013.01); *Y02E 60/50* (2013.01); *Y02E 60/521* (2013.01); *Y02E 60/528* (2013.01); *Y02P 70/56* (2015.11); *Y10T 307/685* (2015.04)

(56) References Cited

U.S. PATENT DOCUMENTS

| | | |
|---|---|---|
| 5,219,671 A | 6/1993 | Parker et al. |
| 6,447,943 B1 | 9/2002 | Peled et al. |
| 6,492,047 B1 | 12/2002 | Peled et al. |
| 2005/0026008 A1 | 2/2005 | Heaton et al. |
| 2009/0028767 A1 | 1/2009 | Parker et al. |

FOREIGN PATENT DOCUMENTS

| | | |
|---|---|---|
| JP | 59-99681 | 6/1984 |
| JP | 2006-526882 | 11/2006 |
| JP | 2003-520412 A5 | 11/2012 |
| KR | 10-2002-0077673 A | 10/2002 |
| WO | 0154216 A2 | 7/2001 |
| WO | WO 2004/109086 A2 | 12/2004 |

OTHER PUBLICATIONS

English translation of Japanese Office Action dated Dec. 10, 2013 corresponding to Japanese Patent App. No. JP2012-549438, 3 pp.
International Search Report and Written Opinion dated Jul. 21, 2011 for corresponding International Patent Application No. PCT/IB2011/000101.
Written Opinion of International Preliminary Examining Authority dated Apr. 4, 2012 for corresponding International Patent Application No. PCT/IB2011/000101.
International Preliminary Report on Patentability dated May 15, 2012 for corresponding International Patent Application No. PCT/IB2011/000101.
Canadian Office Action dated Sep. 20, 2013 from corresponding Canadian Application No. 2,787,640, 3 pages.
European Office Action dated Jul. 12, 2013 from corresponding European Application No. 11 715 021.9, 3 pages.
Second Office Action dated Jan. 14, 2015 for corresponding Chinese patent application No. 201180006913.9, pp. 14.
Office Action dated May 28, 2015 for corresponding Korean patent application No. 10-2015-7003696 with English translation, pp. 15.
R. S. Yeo et al., "A Hydrogen-Bromin cell for energy storage applications", J. Electrochenn. Soc. vol. 4. No. 3(1980) p. 549-555.

ELECTROCHEMICAL SYSTEMS AND METHODS OF OPERATING SAME

This application claims the benefit of U.S. Provisional Application Ser. No. 61/297,853, filed on Jan. 25, 2010, and PCT/IB2011/000101, filed Jan. 24, 2011.

BACKGROUND

1. Field of the Disclosure

This disclosure relates to electrochemical systems, e.g., a combination of an electrical energy source and an electrical energy storage system having a regenerative fuel cell system, that exhibit operational stability in harsh environments, e.g., both charging and discharging reactions in a regenerative fuel cell in the presence of an acid or a mixture of acids, or a halogen ion or a mixture of halogen ions. This disclosure also relates to methods of operating the electrochemical systems containing a regenerative fuel cell system. The electrochemical systems have low cost, fast response time, and acceptable life and performance.

2. Discussion of the Background Art

Fuel cells are electrochemical devices which can convert energy stored in fuels to electrical energy with high efficiencies. There are classes of fuel cells that also allow reversed operation, such that oxidized fuel can be reduced back to unoxidized fuel using electrical energy as an input. The ability to generate electricity and regenerate fuel makes these fuel cells suitable for electrical energy storage.

Acceptance of energy storage and generation technologies depends on their cycle life and performance capability. In particular, with regard to regenerative fuel cells, they can be run, in addition to the direct mode, in the reversible mode, consuming electricity and the products of the direct reaction in order to produce the reactants of the direct reaction. For regenerative fuel cell such as hydrogen/bromine fuel cells, an important factor limiting its cycle life and efficiency is the degradation of the operating fuel cell materials. These materials are exposed to a highly corrosive bromine electrolyte for long periods of time at elevated temperature.

Energy storage and generation devices are needed for wide application with regenerative energy sources. Such storage and generation devices are useful in matching a varying energy supply to a varying energy demand.

The world is facing a major energy and clean air challenges. Renewable energy systems using wind, sun, and water and utilizing advanced energy generating technology offer some potential solutions. Unfortunately, the current state of the art of conventional renewable energy sources, e.g., wind turbine generators and solar energy, and energy storage systems, and the integration of renewable energy sources and energy storage systems, have not been fully developed from a standpoint of efficiency and cost effectiveness to meet the challenges.

Current energy systems typically lack a commercially viable nighttime off-peak energy storage systems. Solid oxide fuel cell systems that generate electricity for utility use are generally designed to use natural gas or methane as the base fuel for hydrogen, thus contributing to air quality degradation. Integrated electrolysis systems have not been fully developed to use low priced off-peak produced renewable energy for producing hydrogen in a cost effective manner. There is a need to effectively integrate a combination of advanced renewable energy systems with energy storage systems to provide efficient and cost effective electrical energy for utility use.

A further need exists for energy storage and generation systems that exhibit operational stability in harsh environments, e.g., both charging and discharging reactions in a regenerative fuel cell in the presence of an acid or a mixture of acids, or a halogen ion or a mixture of halogen ions. Also, a need exists for energy storage and generation systems that are capable of conducting both hydrogen evolution reactions (HERs) and hydrogen oxidation reactions (HORs) in the same system. It would be desirable in the art to provide energy storage and generation systems having low cost, e.g., low cost reactant products, fast response time, and acceptable life and performance.

The present disclosure provides many advantages, which shall become apparent as described below.

SUMMARY

This disclosure generally relates to electrochemical systems, e.g., a combination of an electrical energy source and an electrical energy storage system having a regenerative fuel cell system, that exhibit operational stability in harsh environments, e.g., both charging and discharging reactions in a regenerative fuel cell in the presence of an acid or a mixture of acids, or a halogen ion or a mixture of halogen ions. This disclosure also relates to electrochemical systems that are capable of conducting both hydrogen evolution reactions (HERs) and hydrogen oxidation reactions (HORs) in the same system. This disclosure further relates to electrochemical systems having low cost, fast response time, and acceptable life and performance.

This disclosure relates in part to an electrochemical system comprising an energy storage system and an energy source. The energy storage system comprises a regenerative fuel cell system, at least one fuel storage vessel, and at least one reactant product storage vessel. The regenerative fuel cell system generates electrical energy and reactant product from fuel and oxidizer in a fuel cell mode, and generates the fuel and oxidant from the reactant product and electrical energy in an electrolysis mode. The at least one fuel storage vessel is in fluid communication with the regenerative fuel cell system. The at least one reactant product storage vessel is in fluid communication with the regenerative fuel cell system. The regenerative fuel cell system comprises one or more stacks of regenerative fuel cells, the regenerative fuel cells comprising a housing; a solid electrolyte membrane having a first surface and a second surface, disposed in the housing to partition it into an anode side and a cathode side; an anode formed on the first surface so as to connect the first surface to the anode side; a cathode formed on the second surface so as to connect the second surface to the cathode side. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cells. The energy source is electrically connected to the regenerative fuel cell system to provide electrical energy to the regenerative fuel cell system operating in the electrolysis mode.

This disclosure also relates in part to an electrochemical system comprising a regenerative fuel cell system, a reactant product delivery and/or storage device, and a product/fuel storage device. The regenerative fuel cell system generates electrical energy and reactant product from fuel and oxidizer in a fuel cell mode, and generates the fuel and oxidant from the reactant product and electrical energy in an electrolysis mode. The regenerative fuel cell system comprises one or more stacks of regenerative fuel cells, the regenerative fuel cells comprising a housing; a solid electrolyte membrane having a first surface and a second surface, disposed in the housing to partition it into an anode side and a cathode side; an anode formed on the first surface so as to connect the first surface to the anode side; a cathode formed on the second surface so as to connect the second surface to the cathode side. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cells.

The reactant product delivery and/or storage device is in fluid communication with the regenerative fuel cell system. The reactant product delivery device provides excess reactant product to the regenerative fuel cell system operating in the electrolysis mode, in addition to or instead of the reactant product generated by the regenerative fuel cell system in the fuel cell mode, such that fuel in excess of fuel required to operate the regenerative fuel cell system in the fuel cell mode is generated in the electrolysis mode. The reactant product storage device stores excess reactant product to be provided to the regenerative fuel cell system operating in the electrolysis mode, in addition to the reactant product generated by the regenerative fuel cell system operating in the fuel cell mode.

The product/fuel storage device is in fluid communication with the regenerative fuel cell system. The device optionally removes the excess fuel generated by the regenerative fuel cell system operating in the electrolysis mode from the electrochemical system. The product/fuel storage device stores the products and excess fuel from the charging reaction in electrolysis mode and the discharging reaction in fuel cell mode.

This disclosure further relates in part to a method of operating an electrochemical system containing a regenerative fuel cell system. The method comprises providing an energy storage system comprising a regenerative fuel cell system, at least one fuel storage vessel, and at least one reactant product storage vessel. The regenerative fuel cell system generates electrical energy and reactant product from fuel and oxidizer in a fuel cell mode, and generates the fuel and oxidant from the reactant product and electrical energy in an electrolysis mode. The at least one fuel storage vessel is in fluid communication with the regenerative fuel cell system. The at least one reactant product storage vessel is in fluid communication with the regenerative fuel cell system.

The method further comprises cyclically operating the regenerative fuel cell system in a fuel cell mode to generate electrical energy and reactant product from fuel and oxidizer and in an electrolysis mode to generate the fuel and oxidant from the reactant product and electrical energy. The regenerative fuel cell system comprises one or more stacks of regenerative fuel cells, the regenerative fuel cells comprising a housing; a solid electrolyte membrane having a first surface and a second surface, disposed in the housing to partition it into an anode side and a cathode side; an anode formed on the first surface so as to connect the first surface to the anode side; a cathode formed on the second surface so as to connect the second surface to the cathode side. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cells.

The method yet further comprises providing electrical energy, from an energy source electrically connected to the regenerative fuel cell system, to the regenerative fuel cell system operating in the electrolysis mode.

This disclosure also relates in part to a method of operating an electrochemical system containing a regenerative fuel cell system. The method comprises cyclically operating the regenerative fuel cell system in a fuel cell mode to generate electrical energy and reactant product from fuel and oxidizer and in an electrolysis mode to generate the fuel and oxidant from the reactant product and electrical energy. The regenerative fuel cell system comprises one or more stacks of regenerative fuel cells, the regenerative fuel cells comprising a housing; a solid electrolyte membrane having a first surface and a second surface, disposed in the housing to partition it into an anode side and a cathode side; an anode formed on the first surface so as to connect the first surface to the anode side; a cathode formed on the second surface so as to connect the second surface to the cathode side. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cells.

The method further comprises providing excess reactant product to the regenerative fuel cell system operating in the electrolysis mode, in addition to or instead of the reactant product generated by the regenerative fuel cell system in the fuel cell mode, such that fuel in excess of fuel required to operate the regenerative fuel cell system in the fuel cell mode is generated in the electrolysis mode.

The method yet further comprises storing products and excess fuel from the charging reaction in electrolysis mode and the discharging reaction in fuel cell mode.

Further objects, features and advantages of the present disclosure will be understood by reference to the following drawings and detailed description

DETAILED DESCRIPTION OF THE PREFERRED EMBODIMENT

Figure 1:
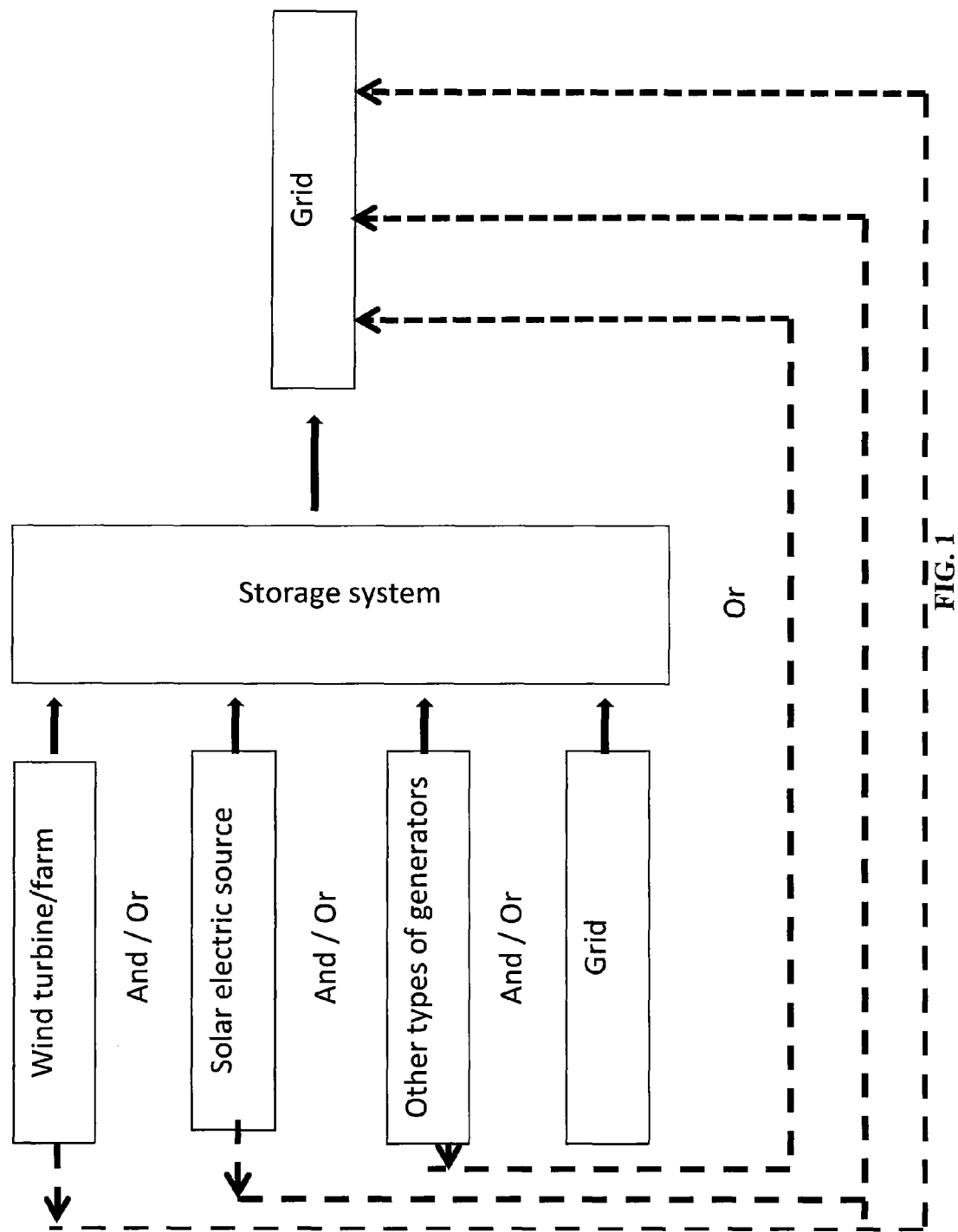
FIG. 1 is a schematic representation of an electrochemical system showing integration of various energy sources with an energy storage system and electrical supply relationship with a grid.

This disclosure relates to electrochemical systems, e.g., a combination of an electrical energy source and an electrical energy storage system having a regenerative fuel cell system. The electrochemical systems can achieve high power for fuel cell technology, e.g., capable of delivering power ranging from less than about 1 watt to greater than about 1 MW, while achieving low cost storage price due to the implementation of low cost reactant products. The capacity (energy) can also be adjusted to numerous configurations ranging from less than about 1 Wh to greater than about 10 MWh. The electrochemical systems of this disclosure also exhibit fast response time.

The electrochemical system of this disclosure includes a regenerative fuel cell system which generates electrical energy and reactant product from fuel and oxidizer in a fuel cell mode and which generates the fuel and oxidant from the reactant product and the electrical energy in an electrolysis mode. The system can also include a reactant product delivery and/or storage device in fluid communication with the regenerative fuel cell system. The system can further include a fuel removal and/or storage device in fluid communication with the regenerative fuel cell system.

The reactant product delivery device can be adapted to supply the reactant product to the regenerative fuel cell system operating in the electrolysis mode, in addition to or instead of the reactant product generated by the regenerative fuel cell system in the fuel cell mode. The reactant product storage device can be adapted to store reactant product to be provided to the regenerative fuel cell system operating in the electrolysis mode, in addition to the reactant product generated by the regenerative fuel cell system operating in the fuel cell mode.

The optional fuel removal device can be adapted to remove the fuel generated by the regenerative fuel cell system operating in the electrolysis mode from the electrochemical system. The fuel storage device can be adapted to store fuel generated by the regenerative fuel cell system operating in the electrolysis mode.

The fuel and reactant product storage devices may comprise any suitable gas, liquid or solid storage devices. Preferably, these devices comprise gas or liquid tanks which are opened and closed with a valve.

The regenerative operation of fuel cells can be applied beyond mere energy storage to produce fuel for uses outside the fuel cell system. A regenerative fuel cell is used to reversibly store electrical energy. When electrical energy is needed from the storage system, the fuel cell operates in a fuel cell or discharge mode. In this mode, fuel is oxidized in the fuel cell, electricity is generated, and part or all of the reactant product is stored, if desired. The system is then recharged in an electrolysis or charge mode. In this mode, the system is recharged by supplying electrical power to the fuel cell, electrolyzing the stored and/or supplied reactant product, thereby regenerating the fuel. The regenerated fuel and optionally the regenerated oxidant are stored and available for energy generation in the fuel cell mode. The system cyclically or alternatively switches operation between the fuel cell and electrolysis modes for any suitable number of cycles. If more electrical energy and reactant product than needed to regenerate the fuel is supplied to the regenerative fuel cell over a predetermined number of operating cycles, then excess or additional fuel can be generated during the electrolysis mode during some or all of these cycles. In other words, more fuel is generated when the system operates in the electrolysis mode than the fuel needed to operate the system in the fuel cell mode. This excess fuel can be used outside the energy storage system.

As an illustration, an energy source is connected via a conduit to an energy storage system. The energy storage system is connected via conduit to the energy consumer. The energy storage system supplies the required power to the energy consumer at all times or at predetermined times, if desired. The energy supplied to the consumer comes from the energy source, or from the energy storage system, or a combination of the two. Such a system decouples the amount of power drawn by the energy consumer from the amount of energy drawn from the energy source.

Examples of the energy source include, but are not limited to, electrical grids, electrical generators and renewable energy sources. Preferred renewable energy sources include photovoltaic sources, such as solar cell arrays, wind power sources, such as wind turbines, tidal power sources in which power is generated from forces of ocean, sea or lake tides, and geothermal power sources in which power is generated from geothermal heat.

The energy storage system is a regenerative fuel cell system as described in more fully herein. Examples of the energy consumer include, but are not limited to, residential households, commercial buildings such as factories, hospitals and office buildings, electrical subgrids, and remote transmitters.

The energy storage system will typically draw more power from the energy source than what is supplied to the energy consumer in the electrolysis mode and the additional power is stored in the form of regenerated fuel. In the fuel cell mode, the energy storage system provides electrical power or energy to the consumer instead of or in addition to the power provided to the consumer from the energy source.

The energy storage system is preferably an electrochemical system which contains a power management system, a regenerative fuel cell system, an optional fuel storage device and an optional reactant product storage device. The energy storage system also contains electrical connection conduits or wires, as well as a fuel conduit and a reactant product conduit which allow the fuel and reactant product to pass between the regenerative fuel cell system and the fuel storage and product storage devices, respectively.

The power management system may be any suitable controller device, such as a computer or microprocessor, and preferably contains logic circuitry which decides how to route the power streams. Energy from the electrical energy source can be directed fully to the electrical energy consumer, fully to the regenerative fuel cell system, or can be partitioned between the electrical energy consumer and the regenerative fuel cell system. It is also possible to feed electrical energy back towards the electrical energy source, which can be applied for example where the electrical energy source is the electrical grid. The power management system also controls from where power is supplied to the electrical energy consumer. Power can be supplied from the electrical energy source, the regenerative fuel cell system, or a combination thereof.

The regenerative fuel cell system may comprise one or more regenerative fuel cells. A regenerative fuel cell is a single electrochemical device which generates reactant product and electrical energy or power in the fuel cell mode and which generates fuel from reactant product and electrical energy in the electrolysis mode.

The regenerative fuel cell system can comprise one or more stacks of regenerative fuel cells. The regenerative fuel cells comprise a housing; a solid electrolyte membrane having a first surface and a second surface, disposed in the housing to partition it into an anode side and a cathode side; an anode formed on the first surface so as to connect the first surface to the anode side; and a cathode formed on the second surface so as to connect the second surface to the cathode side. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cells.

The regenerative fuel cell system can also comprise one or more stacks of regenerative fuel cells comprising a solution or electrolyte compartment, a gas compartment and a membrane electrode assembly (MEA) disposed between the solution or electrolyte compartment and the gas compartment. The membrane electrode assembly (MEA) comprises an anode, a cathode and a solid electrolyte membrane disposed between the anode and the cathode. The anode faces the gas compartment and the cathode faces the solution or electrolyte compartment. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a charging reaction in electrolysis mode and a discharging reaction in fuel cell mode in the regenerative fuel cell.

The regenerative fuel cell system can further comprise one or more stacks of regenerative fuel cells comprising an anode, a cathode and a solid electrolyte membrane disposed between the anode and the cathode. The anode comprises a support and a catalyst dispersed thereon. The cathode comprises a support and a catalyst optionally dispersed thereon. The catalyst dispersed on the anode and the catalyst optionally dispersed on the cathode are the same or different and are capable of catalyzing, in the presence of an acid or a mixture of acids, or a halogen ion or a mixture of halogen ions, a reaction between a fuel and an oxidant to generate an electric current.

The reactant products or electrolytes useful in the electrochemical systems of this disclosure comprise a halogen acid, a mixture of halogen acids, an iron salt and conjugated acid thereof, or a mixture of iron salts and conjugated acids thereof. The gas useful in the energy storage and generation systems of this disclosure comprises hydrogen.

In halogen-hydrogen regenerative fuel cells, the reactant product or electrolyte consists of a halogen acid or a mixture of halogen acids. On charging (electrolysis mode) the halogen molecule, tri-atom and penta-atom complex ions form (depending on the type of the acid used and its concentration) at the halogen positive electrode.

For example, when a high concentration of HBr is used, the oxidation products are: $Br^{3-}$ as the major product, a small concentration of $Br^{5-}$ ions, and a small concentration of dissolved bromine molecules. When using mixture of halogen acids, a mixture of complexes can be formed such as for example: $ClBr_2^-$, $Br_2I^-$ and $IBr_2^-$.

These ions and the dissolved halogen molecule are the oxidation compounds that, on discharge accept electrons from the positive electrode and turn back into the halogen acid (HX). The particular halogen acid to be used in the energy storage and generation systems of this disclosure depends on the end-use application. For example, HCl has a high vapor pressure in comparison to HBr and HI, but the hydrogen chlorine cell has higher voltage. A passive acid (i.e., a acid that does not take part in the cell reactions) such as phosphoric acid can be added to increase electrolyte viscosity. This reduces halide complex ions crossing over to the hydrogen electrode with minor effect on proton conductivity. Other passive acids include sulfuric acid or trifluoromethanesulfuric acid that can be added to increase electrolyte conductivity.

For example, in a hydrogen—tribromide regenerative fuel cell, the hydrogen-tribromide fuel cells and electrolyzers consist of a bromine electrode and a hydrogen electrode with a proton-conducting membrane between them. All cell components, especially the electrodes, must be capable of resisting corrosion by bromine and hydrobromic acid.

The hydrogen-tribromide regenerative fuel cell reaction (discharge) is given by equation 1:

$$H_2 + Br_2 \leftrightarrow 2HBr \qquad [1]$$

From the reversible cell voltage given by the Nernst equation as shown in equation 2, it can be seen that the hydrogen-bromine cell voltage decreases with increasing HBr activity, and increases with $H_2$ pressure and $Br_2$ activity.

$$E = E_0 + \frac{RT}{2F}\ln a_{Br_2} + \frac{RT}{2F}\ln P_{H_2} - \frac{RT}{F}\ln a_{H^+} \cdot a_{Br^-} \qquad [2]$$

where $E_o$ is, in fact, the standard potential of the $Br_2/Br^-$ electrode (1.088V vs. normal hydrogen electrode (NHE)).

The formation of bromine complexes reduces $E_o$ by less than 0.1V. The experimental output circuit voltage (OCV) values at room temperature for a fully-charged regenerative hydrogen-bromine fuel cell based on nano-porous proton conducting membrane (NP-PCM) containing 3-7M HBr are about 1V.

Bromine is highly soluble in aqueous electrolytes. The solubility of bromine in water increases in the presence of bromides as a result of the formation of complex ions like $Br_3^-$ and $Br_5^-$. For example, the solubility of bromine in 1M HBr at 25° C. is 1.495 mole/liter, while in 3.1M NaBr it is 6.83M (partly due to the formation of higher complexes like $Br_5^-$). The color of the solution is yellow at low bromine (or tribromide) concentration and deep red at high bromine (or tribromide) concentrations. The molar absorptivity of bromine gas at 405 nm is 162 and that for aqueous bromine solution at 393 nm is 164.

The formation of tribromide ion in the presence of bromine and bromide is a fast reaction given by equation 3:

$$Br_2 + Br^- \underset{K_b}{\overset{K_f}{\leftrightarrows}} Br_3^- \qquad [3]$$

The equilibrium constant for this reaction at 25° C. is 17. As a result, in practical fuel cells and electrolyzers containing 3 to 7M HBr, most of the bromine is present as tribromide ions (and some as pentabromide ions) and the concentration of free bromine is low. For example, at 25° C. in a solution of 3M HBr and 1M $Br_2$, the concentrations of $Br_3^-$ and $Br_2$ (ignoring the formation of pentabromide ions which further reduces the bromine concentration) are 0.97 M and 0.03 M respectively.

In the hydrogen-bromine fuel cell, there are two major parallel reactions at the bromine electrode (equations 4 and 5):

$$Br_3^- + 2e^- \underset{oxidation}{\overset{reduction}{\longleftrightarrow}} 3Br^- \qquad [4]$$

$$Br_2 + 2e^- \underset{oxidation}{\overset{reduction}{\longleftrightarrow}} 2Br^- \qquad [5]$$

Since, in practical fuel cells with high HBr concentration, the concentration of free bromine is much smaller than that of the tribromide ion, it is expected that the reaction in equation 4 prevails. In this (and similar) regenerative fuel cells, the oxidizing species such as $Br_3^-$ and $Br_2$ crossover to the hydrogen electrode and reduce regenerative fuel cell performance. This can be reduced by using a selective membrane such as nanoporous proton conducting membrane which reduces this crossover significantly. In order to reduce the bromine ($Br_2$) concentration, or to increase its molecular size, organic compounds such as N-ethylpyrrolidinium bromide, N-methylpyrrolidinium bromide, N-chloroethylpyrrolidinium bromide, N-chloromethylpyrrolidinium bromide, and others can be used at low concentrations to complex. However, it is necessary to pick organic compounds that do not interfere with the hydrogen electrode. Also, the additives concentration should be low enough to avoid phase separation.

In iron-hydrogen regenerative fuel cells, the reactant product or electrolyte consists of an iron salt and the conjugated acid or a mixture of different iron salts their conjugated acids to achieve multiple iron ligands. The charge transfer process in Fe(III)/Fe(II) redox couple is an inner sphere process, therefore the charge transfer kinetics is highly dependent on the nature of the iron complex and its electrochemical characteristics. In the presence of different ligands, Fe(III) and Fe(II) ions can take a form of free ions or complexes in the solution, hence presenting a challenge in choosing the optimal electrolyte composition and the optimal operation conditions for each composition. The cell reaction is given in equation 6a for a monoprotic acid and equation 6b for diprotic acid.

$$H_2 + FeX_3 \leftrightarrow FeX_2 + HX \quad [6a]$$

$$H_2 + Fe_2(X)_3 \leftrightarrow FeX + H_2X \quad [6b]$$

Illustrative iron salts and conjugated acids useful in the energy storage and generation systems of this disclosure include:

| Iron salt | Conjugated acid |
|---|---|
| $Fe_2(SO_4)_3$ | $H_2SO_4$ |
| $FeCl_3$ | HCl |
| $FeBr_3$ | HBr |
| $FeI_3$ | HI |
| $Fe(CF_3SO_3)_3$ | $CF_3SO_3H$ (triflic acid) |
| $Fe(ClO_4)_3$ | $HClO_4$ |

Different ligands, acids and concentrations may affect regenerative fuel cell characteristics and will afford solutions to different applications. For example, the use of $Fe_2(SO_4)_3$ and $H_2SO_4$ may result in higher operation potential and the use of $FeCl_3$HCL may enable working in higher concentrations.

When dealing with conductive electrolytes and fuel cell stacks that are connected electrically in series directly to each other, shunt currents can be develop between stacks. Like the shunt currents found within fuel cell stacks, those currents will cause chemical reactions that will reduce the efficiencies of the energy storage and generation system.

When connecting fuel cell stacks electrically in series, the shunt currents can develop on the inlet and outlet manifold that supply the conductive electrolyte to the fuel cell stacks. As more fuel cell stacks are connected in series, the voltage potential developed within the main inlet and outlet feed tubing gets higher. Shunt currents can be reduced in two different ways, namely mechanically or electronically.

The reactant product delivery and/or storage device of this disclosure can comprise (i) an electrolyte feed inlet opening and an electrolyte feed line extending from the electrolyte feed inlet opening exteriorly from the one or more stacks of regenerative fuel cells, the electrolyte feed line in fluid communication with the at least one vessel suitable for holding an electrolyte, for delivery of electrolyte into the one or more stacks of regenerative fuel cells; and (ii) an electrolyte discharge outlet opening and an electrolyte discharge line extending from the electrolyte discharge outlet opening exteriorly from the one or more stacks of regenerative fuel cells, the electrolyte discharge line in fluid communication with the at least one vessel suitable for holding an electrolyte, for removal of electrolyte from the one or more stacks of regenerative fuel cells.

At least a portion of the electrolyte feed line adjacent to the electrolyte feed inlet opening has a coiled configuration, and at least a portion of the electrolyte discharge line adjacent to the electrolyte discharge inlet opening has a coiled configuration. The diameter and length of at least a portion of the electrolyte feed line adjacent to the electrolyte feed inlet opening having a coiled configuration, and the diameter and length of at least a portion of the electrolyte discharge line adjacent to the electrolyte discharge inlet opening having a coiled configuration, can the same or different.

The stacks of regenerative fuel cells useful in the energy storage and generation systems of this disclosure can be connected mechanically in series.

Figure 2:
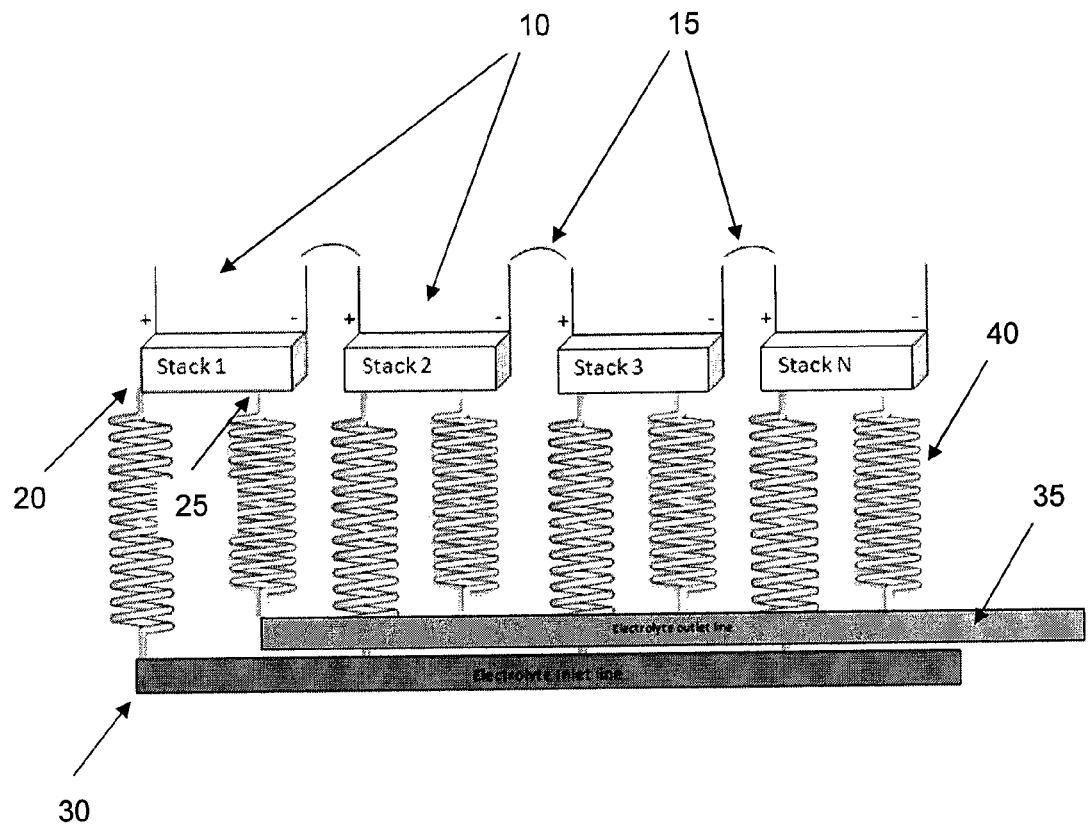
FIG. 2 is a schematic representation of a mechanically connected fuel cell stack in series.

FIG. 2 illustrates a mechanically connected fuel cell stack in series. FIG. 2 shows four fuel cell stacks 10 which are electrically connected in series 15. Instead of connecting the inlet 20 and outlet 25 of each fuel cell stack directly to the main feed (electrolyte inlet line) 30 and drain (electrolyte outlet line) 35 piping, long low diameter tubing is added 40. The tubing 40 is preferably in coiled configuration. This tubing 40 adds ionic resistor in series to the fuel cell stack 10 and helps to increase the net ohmic resistance of the ionic solution, thereby reducing losses due to shunt currents. The channels going between each fuel cell stack 10 and the inlet line 30 are drawn longer than that going from the same fuel cell stack 10 to the output line 35, but this is not necessarily so in practice and in many embodiments they are of the same length for a given fuel cell stack 10. A simplified estimate of the diameter and length of the tubing 40 can be described in the following way, and the parameters of the tubing should fit the equation below.

V (volts)—the total voltage in the array of stacks connected in series.
I (Amp)—the operating current of each stack.
L (%)—approved percentage of shunt current losses in the system.
IL (Amp)—current losses by shunt–I*L.
R (Ohm)—tubing ionic resistance=V/IL
S (Ohm/cm3)—solution resistance
D (cm)—tubing diameter.
X (cm)—tubing length $$R = 3.14 * (D/2)^2 * X * S.$$

The length of the inlet and outlet tubing of each fuel cell stack in the array does not have to be the same all across the array. A differential approach can also be used, for example, where the stack in the middle of the array has the shortest inlet and outlet tubing, while moving to the sides of the array the length of tubing for each fuel cell stack is increased.

An example of tubing calculation for mechanically connection of three fuel cell stacks in series is given below.

| | |
|---|---|
| Total voltage of 3 stacks array, V | 450 |
| Current, A | 120 |

| | |
|---|---|
| Approved shunt current losses, % | 1 |
| Current losses by shunt current, A | 1.2 |
| Tubing Ionic resistance, Ohm | 375 |
| Solution resistance, Ohm/cm$^3$ | 0.05 |
| Tubing diameter, cm | 5 |
| Tubing length, m | 3.8 |

For a reference case, using the same equation above, but taking connection tubing with only 1 m length, will result in increase current losses by shunt to 4.6 Ampere, which is almost 4% of the total current.

The use of electronics in order to eliminate shunt current over mechanical tubing can reduce the complexity of system tubing, make the system more compact, and allow to form any combination of fuel cell stacks in order to achieve the optimal output voltage.

The stacks of regenerative fuel cells useful in the energy storage and generation systems of this disclosure can be connected electronically in series. The stacks of regenerative fuel cells that are connected electronically in series can be connected by an electronic appliance having an input that is not electrically connected to its output. The electronic appliance can include, for example, a DC/DC converter or a DC/AC converter.

Figure 3:
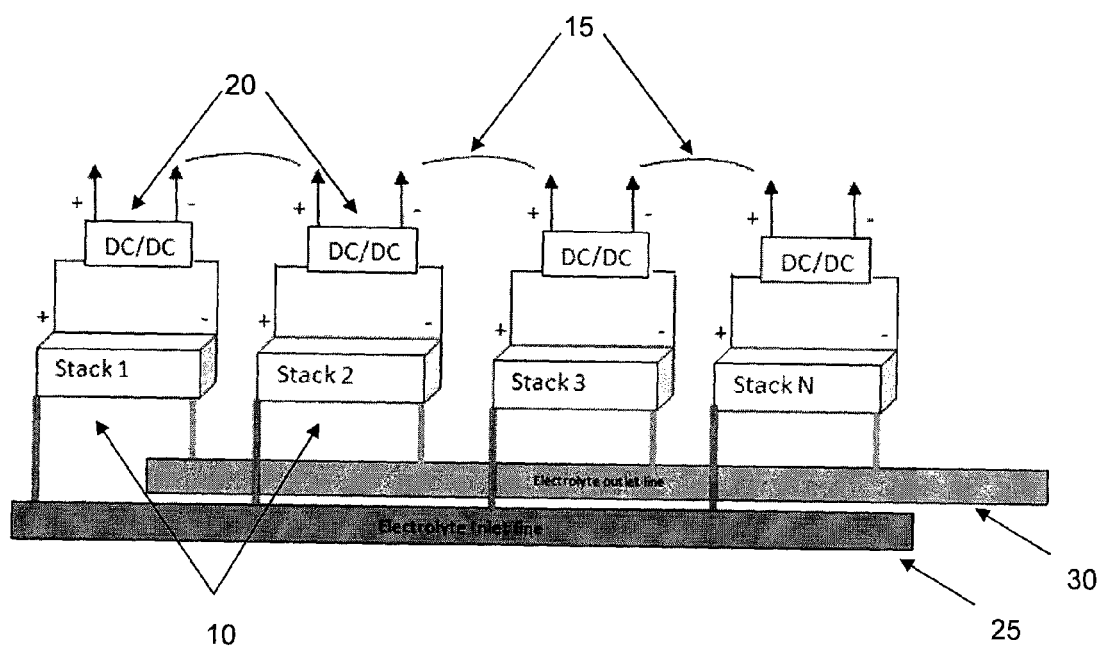
FIG. 3 is a schematic representation of an electrically connected fuel cell stack in series.

FIG. 3 illustrates an electronically connection of fuel cell stacks in series. FIG. 3 schematically shows a number of fuel cell stacks 10, where shunt currents are electronically reduced. The reduction is achieved by connecting the fuel cell stacks 10 to each other 15 via an electronic appliance having an input that is not electrically connected to its output (common ground), for example, a DC/DC converter 20. Each fuel cell stack is connected directly to the main feed (electrolyte inlet line) 25 and drain (electrolyte outlet line) 30.

In DC/DC or DC/AC converters, for example, the current conversion is achieved by inductive circuits, without electrical connection between the input and the output (mainly the ground). Each fuel cell stack is connected directly to DC/DC or DC/AC or any other electronic components where the input and output are not electrically connected. The output of each electronic device is connected in series to achieve high voltage output from the array. By eliminating physical electric connection between the fuel cell stacks prior to the electrical insulation device, no shunt currents will develop on the main inlet 25 and outlet 30 feed tubing.

The electrochemical system of this disclosure can include a gas purifier containing a catalyst sufficient to reduce or eliminate corrosive elements from the gas. The gas exiting the fuel cell during hydrogen production stage (energy storage step), and excess hydrogen not consumed during discharge stage (energy generation step), may contain corrosive elements derived from the liquid electrolyte. These elements, such as wet halogen vapor, are corrosive and should be left out of the general gas stream for safer storage and easier material selection.

In order to eliminate corrosive halogen vapors from the general gas stream, oxidation of the halogen with hydrogen over catalytic matrix occurs. The catalytic matrix can be placed inside a reactive vessel which is located on the hydrogen exhaust stream of the fuel cell. Hydrogen with corrosive residuals enter the reaction vessel inlet and leave through the vessel outlet after the reaction of the corrosive elements has taken place.

The catalyst placed inside the reaction vessel is comprised of non-active catalytic beads and active catalytic particles. The non-active catalytic beads are made of any porous material like silica ($SiO_2$), carbon particles or alumina ($Al_2O_3$). The surface area of the supported beads can vary from about 0.1-350 m$^2$/g, preferably from about 0.1-100 m$^2$/g, and more preferably from about 0.1-1 m$^2$/g. The catalyst particle size is determined by the desired pressure loss across the reactor. The active catalyst can be embedded on the non-active beads by conventional methods, e.g., chemical or physical. The loading of the active catalyst on the non-active porous beads can range from about 0.01-5 wt %, preferably from about 0.1-1 wt %, and more preferably from about 0.4-0.6 wt %. The non-active beads can be treated with hydrophobic material, e.g., polytetrafluoroethylene (PTFE) or polyvinylidene fluoride (PVDF), to enhanced its performance, and increase its durability. The hydrophobic load can vary from about 1-30 wt %, preferably from about 10-25 wt %, and more preferably from about 18-20 wt %.

In an embodiment, the electrolyte and gas are maintained at a different pressure inside the one or more fuel cell stacks used in the electrochemical systems of this disclosure. The electrolyte pressure is preferably maintained lower than the gas pressure within the fuel cell stack. In particular, a pressure differential controller in fluid communication with a pressure reducing valve can be used for controlling the pressure of electrolyte entering the fuel cell stack sufficient to maintain the electrolyte pressure different from the gas pressure within the fuel cell stack.

In an embodiment of this disclosure, it is desirable to keep the electrolyte pressure lower than the hydrogen pressure inside the fuel cell stack. Maintaining higher pressure on the hydrogen than on the electrolyte can have several advantages. The advantages can be thermodynamic, kinetic, durability and safety. For example, with regard to Thermodynamic, a potentially higher discharge voltage may be achieved. With regard to kinetic, better mass transport and activation energy can be achieved when the hydrogen side of the fuel cell is over pressured relative to the solution side. With regard to durability, higher hydrogen pressure keeps the hydrogen electrode hydrophobic properties for longer time and also helps to eliminate water droplets from the hydrogen side of the fuel cell. With regard to safety, the higher hydrogen pressure in the fuel cell keeps the electrolyte from crossing over into the hydrogen side of the fuel cell in case of membrane rupture or other leakage.

This disclosure provides catalyst compositions that include at least one precious metal. The catalyst compositions are capable of catalyzing a charging reaction and a discharging reaction in a regenerative fuel cell, e.g., a hydrogen/bromine regenerative fuel cell. The catalyst compositions are also capable of catalyzing hydrogen redox reactions and halogen/halide redox reactions. Further, the catalyst compositions are capable of catalyzing hydrogen evolution reactions (HERs) and hydrogen oxidation reactions (HORs). Particularly, the catalyst compositions are capable of catalyzing HERs and HORs in harsh environments, e.g., in the presence of a halogen ion or a mixture of halogen ions.

With regard to the fuel cell stacks, the catalyst compositions useful in this disclosure can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst compositions include PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst compositions useful in this disclosure include those where the at least one precious metal is supported on carbon powder or ceramic powder.

The catalyst compositions useful in this disclosure include precious metals, precious metal alloys (e.g., precious metals alloyed with other precious metals, transition metals and/or other elements), or precious metal mixtures (e.g., precious metals mixed with other precious metals, transition metals and/or other elements). The catalysts have been found to be more active towards HOR and HER reactions and more stable in tri-bromide solutions than state-of-the art Pt catalysts. The catalysts can be used for HOR in proton exchange membrane fuel cells (PEMFCs).

The catalyst compositions can be made by conventional procedures known in the art. The catalysts can be synthesized and characterized by conventional physical characterization methods and their activity can be tested electrochemically. The catalysts can be supported on carbon or ceramic powder. The catalyst compositions can be synthesized, for example, by electroless deposition or by polyol method. The catalyst compositions useful in this disclosure having a core-shell structure (or a skin structure) can be prepared by conventional procedures known in the art.

The unsupported catalysts useful in this disclosure have grain sizes typically in the range of from about 2 to about 8 nm, excluding Pd containing catalysts which grain size is in the range of from about 26 to about 53 nm. The supported catalysts useful in this disclosure have grain sizes typically in the range of from about 2 to about 7 nm. Most of the Pt and Ir containing catalysts comprise a skin-type structure, having an outer-shell rich in platinum, iridium and their alloys. In an embodiment, this disclosure includes skin-type catalysts. Skin-type catalysts were found to be highly active and stable in HER and HOR reactions in HTBFCs, tested in-situ and ex-situ. The durability of the catalysts useful in this disclosure, including sub monolayer ones, atom islands, and one or more monolayers of Pt and Ir and their alloys, with or without other elements, were found to be very good. Many thousands of charge-discharge (HOR/HER) cycles were achieved utilizing the catalysts of this disclosure in a hydrogen/bromine regenerative fuel cell.

In particular, for the catalyst compositions useful in this disclosure comprising a core-shell structure (or a skin structure), the core (or particle) preferably contains a low concentration of Pt or a Pt alloy. The Pt alloy can include one or more other precious metals, e.g., Ru, Re, Pd and Ir, and optionally one or more transition metals, e.g., Mo, Co and Cr. The core may also comprise a Pt-free metal or alloy. The Pt-free metal can include one or more precious metals, e.g., Ru, Re, Pd and Ir. The Pt-free alloy can include two or more precious metals, e.g., Ru, Re, Pd and Ir, and optionally one or more transition metals, e.g., Mo, Co and Cr. The shell (or skin) preferably comprises a sub-monolayer, or atom islands, to one or more layers of a precious metal, e.g., Pt or Ir, and alloys thereof. The Pt and Ir alloys can include one or more other precious metals, e.g., Ru, Re, and Pd, and optionally one or more transition metals, e.g., Mo, Co and Cr. The one or more other precious metals, e.g., Ru, Re, and Pd, are preferably present in the Pt and Ir alloys in a minor amount. Likewise, the one or more transition metals, e.g., Mo, Co and Cr, are preferably present in the Pt and Ir alloys in a minor amount. The catalyst compositions useful in this disclosure are capable of catalyzing, in the presence of an acid or a mixture of acids, or a halogen ion or a mixture of halogen ions, a charging reaction and a discharging reaction in a regenerative fuel cell.

Carbon powder can also be a suitable catalyst for use in this disclosure. For bromide/tribromine redox reaction in the solution electrode, it has been found that carbon powder itself is an effective catalyst for the processes, reduction and oxidation. In another embodiment, the solution electrode may be used without any metallic catalyst.

This disclosure provides electrodes that are useful in the operation of fuel cells. The electrodes useful in this disclosure include anodes and cathodes that each include a support and a catalyst dispersed thereon. The cathodes can be without a catalyst, e.g., carbon only. The electrodes can be made by processes described herein or by conventional procedures known in the art.

The catalysts dispersed on the electrodes are commonly nano particles (preferably 2-5 nm) of Pt, Ir, Pt alloys, and Ir with or without other elements. However, in order to save the cost of expensive noble metals, it is possible to use non-noble metal based alloys such as for example Ni, Fe, Co, Ir, or Ru as the core and coat them with the required noble metal catalyst by common electrochemical or chemical processes. The thickness of such catalyst layer may be between less than one monolayer to 10 monolayers.

Electrodes according to this disclosure are porous, and are made by processes designed to control their porosity and hydrophobicity. For example, the electrodes can be fabricated by coating a carbon support (for example, a commercially available carbon cloth or paper) with a suspension comprising carbon powder, a polymeric binder, and in some cases a pore-former. The suspension can optionally comprise powder of metallic catalyst. For solution electrodes, a metallic catalyst is optional, whereas for hydrogen electrodes, a metallic catalyst is required. The suspension (with or without catalyst) is referred herein as "ink". The suspension is mixed for several hours, applied to the carbon support, solidified, optionally by drying and heating, and then washed, for example, with solvents and/or water to remove the pore former, leaving pores behind. The resulting layer is called a microporous layer or a diffused layer and, in the gas side, it is called a gas diffused layer (GDL). Electrodes used with rechargeable fuel cells in accordance with this disclosure have a porosity of between about 30% and about 80% (vol/vol). Preferably, a porosity of between about 40% and about 80% (vol/vol) provides convenient and efficient electrodes.

In an embodiment, the fuel cell uses the same electrodes for charging and for discharging modes. In such an embodiment, the fuel cell typically has a solution compartment, a hydrogen compartment, and a membrane electrode assembly connecting between them. The electrodes can be used in different types of fuel cells, and preferably are used in regenerative fuel cells, e.g., hydrogen/bromine regenerative fuel cells.

The porous electrode can comprise a gas diffusion layer, characterized by the reactant or/and the product being a gas ($H_2$ in the case of HTBFC) and catalytic layer, having a highly dispersed catalytic powder mixed with polymeric binder, e.g., PVDF (polyvinylidene fluoride) and PTFE (polytetrafluoroethylene) ionomer such as Nafion™ polymer. The reaction can take place at the three-phase zone, where gas and liquid electrolyte react on a solid catalyst surface.

The anodes and cathodes useful in this disclosure can comprise a catalyst layer and a porous backing layer. A preferred catalyst used at the anode is, for example, nano sized Pt—Ir alloy powder. A preferred catalyst used at the cathode is, for example, the same nano sized Pt—Ir alloy powder as used at the anode. The cathode can be without a catalyst, e.g., carbon only. The core-shell structure (or a skin structure) catalysts include sub-monolayers, atom islands, and one or more layers of a precious metal, e.g., Pt or Ir, and alloys thereof, with or without other elements. In such alloys used in the core-shell structure (or a skin structure) catalysts, the ratio between platinum or iridium and the metal (Pt:M or Ir:M atomic ratio) is between about 1:10 to about 10:1.

The backing layer is preferably made of carbon. This backing layer is porous and is used for support and at the same time for making electrical contact between the housing and the catalyst powder, which by itself is connected to the membrane.

As a result of long operation, the bond between the catalyst particles and the supporting carbon matrix is lost, leading to the degradation of the fuel cell. In view of that it is proposed in this disclosure to bind the nano size catalyst to a nano size ceramic powder and subsequently bind the obtained particles to the carbon backing layer and to the proton conducting membrane (PCM). A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size and structure of the catalyst particles. For the anode it is preferred to form either a Pt—Ru or Pt—Ir alloy catalyst layer or to form two consecutive layers of either Pt on Ru or Pt on Ir with atomic ratio of 1:10 to 10:1. Other elements, like Sn, Mo, or Ni can be added to the catalyst layer to further improve reaction kinetics. Catalyst layers for the anode and cathode can be the same or different.

For the anodes useful in this disclosure, the catalyst comprises at least one precious metal. The catalyst is capable of catalyzing a charging reaction and a discharging reaction in a regenerative fuel cell, e.g., a hydrogen/bromine regenerative fuel cell. The catalyst is also capable of catalyzing hydrogen redox reactions. Further, the catalyst is capable of catalyzing HERs and HORs. Particularly, the catalyst is capable of catalyzing HERs and HORs in harsh environments, e.g., in the presence of an acid or a mixture of acids, or a halogen ion or a mixture of halogen ions.

For the anodes useful in this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anodes useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports useful in this disclosure can have any number of possible porosities and/or void spaces associated therewith.

The anode can comprise a carbon support layer, optionally a gas diffusion layer, and a catalytic layer. The catalytic layer can be coated onto the carbon support layer. The gas diffusion layer can be coated onto the carbon support layer and the catalytic layer can be coated onto the gas diffusion layer. The catalytic layer can also be coated onto the solid electrolyte membrane or proton conducting membrane.

For the cathodes useful in this disclosure, the catalyst comprises carbon powder and/or at least one precious metal and carbon powder. The cathode can be without a catalyst, e.g., carbon only. The catalyst is capable of catalyzing, in the presence of an acid or a mixture of acids, or a halogen ion or a mixture of halogen ions, a charging reaction and a discharging reaction in a regenerative fuel cell, e.g., a hydrogen/bromine regenerative fuel cell. The catalyst is also capable of catalyzing halogen/halide redox reactions.

For the cathodes useful in this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Pt/Ir, Pd/Ir, Pt/Ru, (Par)/Ru, Ir/Ru, (PtRe)/Ir, and (PtRu)/Ir. The catalyst useful in this disclosure include those where the at least one precious metal is supported on carbon powder or ceramic powder.

For the cathodes useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports useful in this disclosure can have any number of possible porosities and/or void spaces associated therewith.

The cathode can comprise a carbon support layer, optionally a microporous layer, and optionally a catalytic layer. The catalytic layer can be coated onto the carbon support layer. The microporous layer can be coated onto the carbon support layer and the catalytic layer can be coated onto the microporous layer. The catalytic layer can also be coated onto the solid electrolyte membrane or proton conducting membrane.

In the MEA described above, the catalyst dispersed on the anode and the catalyst dispersed on the cathode are capable of catalyzing hydrogen redox reactions and halogen/halide redox reactions. Also, in the MEA, the catalyst dispersed on the anode and the catalyst dispersed on the cathode are capable of catalyzing a charging reaction in electrolysis mode and a discharging reaction in fuel cell mode in a regenerative fuel cell in the presence of an acid or a mixture of acids, or a halogen ion or a mixture of halogen ions.

In the MEA, a preferred solid electrolyte membrane is a proton conducting membrane having pores with a diameter size which is essentially smaller than 30 nm. The solid proton conducting membrane comprises: (i) 5% to 60% by volume of an electrically nonconductive inorganic powder having a good acid absorption capacity, the powder comprising essentially nanosize particles; (ii) 5% to 50% by volume of a polymeric binder that is chemically compatible with acid, oxygen and said fuel; and (iii) 10 to 90% by volume of an acid or aqueous acid solution.

The solid proton conducting membranes useful in the fuel cells useful in this disclosure are described in U.S. Pat. Nos. 6,447,943 and 6,492,047, which are incorporated herein in their entirety by reference thereto. The polymeric binders used in these membranes are selected from the group consisting of: poly(vinylidenfluoride), poly(vinylidenfluoride) hexafluoropropylene, poly(tetrafluoroethylene), poly(methyl methacrylate), poly(sulfoneamide), poly(acrylamide), poly (vinylchloride), acrylonitrile, poly(vinylfluoride), Kel F™ and any combinations thereof.

The inorganic nanosize powder used for preparing the solid proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

The proton conducting membranes useful in the fuel cells useful in this disclosure also comprise an acid or aqueous acid solution. As opposed to the solid electrolyte membrane described, for example, in U.S. Pat. No. 5,599,638, which is incorporated herein by reference thereto in its entirety, wherein no acid is present in free form, the solid electrolyte membrane discussed here, when used in the fuel cells, contains free acid molecules entrapped in the pores of the membrane. Alternatively, it may contain acid molecules bonded to the inorganic powder. The typical diameter of these pores is essentially smaller than 30 nm, preferably smaller than 20 nm, and more preferably smaller than 3 nm.

A large variety of low vapor pressure acids that are compatible with the cell hardware and with the catalysts at both electrodes can be used and adapted to a specific application. The following list of acids is given for example: polyfluoroolefin sulfonic acid, perfluoroolefin sulfonic acid, polyfluoroaryl sulfonic acids such as polyfluorobenzene, polyfluorotoluene, or polyfluorostyrene sulfonic acid, perfluoroaryl sulfonic acids such as perfluorobenzene, perfluorotoluene or perfluorostyrene sulfonic acid, similar acids where up to 50% of the hydrogen or fluorine atoms were replaced by chlorine atoms, $CF_3(CF_2)_nSO_3H$, $HO_3S(CF_2CH_2)_nSO_3H$, $CF_23(CF_2CH_2)_nSO_3H$, $HO_3S(CF_2)_nSO_3H$, where n is an integer having a value of 1 to 9, Nafion™ ionomers, HCl, HBr, phosphoric acid, sulfuric acid, and mixtures thereof.

Alternatively, the solid electrolyte membrane is a proton conducting membrane (PCM) comprising pores with a typical diameter size which is essentially smaller than 50 nm, preferably smaller than 3 nm, and more preferably smaller than 1.5 nm.

A further membrane according to the present disclosure is film made of a proton conducting matrix as described in U.S. Pat. No. 6,811,911, which is incorporated herein in its entirety by reference thereto. The ion conducting matrix comprises: (i) 5% to 60% by volume of an inorganic powder having a good aqueous electrolyte absorption capacity; (ii) 5% to 50% by volume of a polymeric binder that is chemically compatible with an aqueous electrolyte; and (iii) 10 to 90% by volume of an aqueous electrolyte, wherein the inorganic powder comprises essentially sub-micron particles, preferably from about 5 to about 150 nm in size. The matrix of the present disclosure may, optionally, comprise between about 0.1% to about 25% of a non-volatile liquid lubricant that is chemically compatible with all the components in the matrix.

In accordance with a preferred embodiment of the present disclosure, the inorganic powder is characterized in that it has a surface area of at least 10 $m_2/g$, and possesses a good absorption capability for the aqueous electrolyte.

The PCM of the present disclosure has the general appearance of a plastic film having good mechanical properties. It can typically be bent to about 180° with no substantial fractures occurring, and it can be prepared in thickness being in the range of from about 10 to about 1000 microns or more. Due to its stability and good ionic conductivity, it can be used at a large temperature range of from sub-zero to about 150° C.

According to a preferred embodiment of the disclosure, where the matrix is in the preparation of a membrane, the inorganic powder comprised in the matrix is a very fine, electronically non-conductive powder having a particle size of preferably less than 150 nm. According to this embodiment, the PCM pores in which the aqueous electrolyte is absorbed are very small, and their characteristic dimension is essentially smaller than 50 nm.

The absorption capacity or the retention capability of the membrane for the acid or the aqueous electrolyte used depends on several parameters, among which are the composition and the type of the inorganic powder, the polymeric binder and the type of the dissolved acid or electrolyte. The combination of these parameters should be optimized in order to tailor the product for each application. While carrying out such optimization, consideration should be given to the fact that the highest the content of inorganic powder is the inferior the mechanical properties become. Increasing the inorganic powder content of the matrix increases its electrolyte retention characteristic, but at the same time, decreases its mechanical strength. On the other hand, increasing the polymeric binder in the matrix increases the strength of the latter, but decreases the wettability of the matrix thus turning it to a less conductive one.

According to yet another embodiment of the disclosure, an improvement of the matrix wettability and consequently the electrolyte retention, is achieved by adding to the membrane multi valance metal salts such as Al, Zr, B, Ti and the like.

According to another embodiment of the disclosure, the improvement of the matrix wettability and consequently the electrolyte retention is achieved by pre-treating the inorganic powder with an acid or a base prior to the preparation of the membrane.

This disclosure also relates to a process for producing a proton-conducting membrane (PCM), the process comprising: mixing (i) 5% to 60% by volume of an electrically non-conductive inorganic powder having a good acid absorption capacity, the powder comprising essentially nanosize particles; (ii) 5% to 50% by volume of a polymeric binder that is chemically compatible with acid, oxidizer and the fuel; and (iii) 10 to 90% by volume of an acid or aqueous acid solution, wherein the mixing is conducted at various rate steps, thereby producing a proton-conducting mixture; continuously casting the proton-conducting mixture on rolled paper, non-woven matrix or any other coatible material at ambient temperature; drying the casted proton-conducting mixture at a temperature of greater than 100° C. for approximately 5 to 60 minutes, thereby forming a dry film; laminating a plurality of the dry films together under pressure, and thereafter extracting pore-former out of pores of the dry films, thereby forming the proton-conducting membrane having an average pore size of less than 30 nanometers.

The PCM of the present disclosure comprises a nanosize ceramic powder with good acid adsorption capacity, a polymer binder, and an acid absorbed in nanosize pores. This PCM is particularly useful in regenerative fuel cell (RFC) applications.

The main components of the PCM are a polymeric binder, an inorganic nanosize powder, and an acidic solution or acid. The typical diameter of the PCM pores is about between 1.5 to 30 nm, preferably 3 nm. The pores are filled with free acid molecules, which is a major advantage for the application of energy storage system (e.g., RFC applications) that uses an acidic electrolyte.

The reagents (i.e., powders and solvents) are mixed with additives that improve the quality of the solution and results in better mechanical and physical properties of the cast film. The solution is then cast using a mechanical coater, which is a more efficient process and more homogeneous one.

Preferably, at least 2 to 6, preferably 4, of the dry films are laminated together. The various rate steps of the mixing step comprises: mixing for between 1 to 5 hours at a mixing rate of between about 100 to 500 rpm at room temperature; mixing for between 10 to 20 hours at a mixing rate of between about 400 to 700 rpm at a temperature in the range between about 30 to 50° C.; mixing for between 10 to 20 hours at a mixing rate of between about 100 to 400 rpm at room temperature; and degassing for between 5 to 30 minutes at a temperature in the range between about 30 to 50° C. The step of continuously casting the proton-conducting mixture is performed using a coater machine for solution application over the rolled paper, non-woven matrix or the like roll to roll carrier support.

The carrier support is a siliconized paper, and the rolling speed of the carrier support is set according to the specific gravity of the proton-conducting mixture.

The dry film has a thickness between about 40 to 60 micrometers, more preferably between about 50 to 55 micrometers.

Preferably, the step of laminating the dry films is performed at the pressure in the range between about 5 to 20 $kg/cm^2$ and at a temperature in the range between about 130 to 150° C. for between about 3 to 10 minutes.

The process further comprising adding at least one rheology control agent prior to mixing. The rheology control agent is at least one selected from the group consisting of: SPAN80 (generic chemical description sorbitan monooleate, $C_{24}H_{44}O_6$), and Zonyl® FSN (generic chemical description $(C_2H_4O)_x(CF_2)_yC_2H_5FO$, nonionic fluorosurfactant).

The extraction step comprises: (a) immersing the proton-conducting membrane with pore-former in an ether/ethanol mixture for a period of time sufficient to remove the pore-former from the pores of the proton-conducting membrane; (b) immersing the proton-conducting membrane from step (a) in ethanol to remove any residual pore-formers and other solvents; and (c) immersing the proton-conducting membrane in water to remove the ethanol from the pores.

The ether/ethanol mixture has a ratio of between about 1:9 to 3:7. The immersing step (a) takes place for between about 1 to 5 hours. The immersing step (b) takes place for between about 1 to 5 hours.

The polyfluoroaryl sulfonic acid is at least one selected from the group consisting of: polyfluorobenzene, polyfluorotoluene, and polyfluorostyrene sulfonic acid. The perfluoroaryl sulfonic acid is at least one selected from the group consisting of perfluorobenzene, perfluorotoluene and perfluorostyrene sulfonic acid.

The process further comprising a pore-former selected from the group consisting of: DBP (i.e. dibutyl phthalate), diethyl phthalate, dimethylphthalate, propylene carbonate, ethylene carbonate and the like or any combinations thereof.

The process further comprising the step of recapturing the acid or aqueous acid solution.

The PCMs used in the fuel cells useful in this disclosure have good ionic conductivity, are not affected by heavy metals impurities, and can be used at temperatures even higher than 100° C. or lower than 0° C.

Nanoporous-proton conducting membranes (NP-PCM) employed in the MEAs useful in this disclosure allow water management which prevents porous electrodes from flooding. This makes such electrodes advantageous for use in the fuel cells useful in this disclosure.

In the MEA, the catalyst dispersed on the anode is capable of catalyzing hydrogen redox reactions—HERs and HORs. Further, the catalyst dispersed on the anode is capable of catalyzing HERs and HORs in the presence of an acid or a mixture of acids, or a halogen ion or a mixture of halogen ions.

For the anode in the MEA useful in this disclosure, the catalyst can include, for example, Ir, Ru, Pd, Pt, Mo, Re, Cr, Ta, Ni, Co, Fe, and mixtures thereof. In an embodiment, the catalyst compositions include, for example, (PtRe)/M, (PdRe)/M, and (PtM)/Ir, wherein M is a precious metal or a transition metal. Preferably, the catalyst includes PtRe, PdRe, PtIr, PdIr, PtCr, PtRu, Pt/Ir/Ru, PtReCo, PtReMo, Ir/Ru, (PtRe)/Ir, (PtRu)/Ir, (PtReMo)/Ir, and (PtReCo)/Ir. The catalyst useful in this disclosure include those where the at least one precious metal is supported on carbon powder or ceramic powder.

For the anode in the MEA useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The anode support may have any number of pores and pore sizes such as, for example, random and ordered pore arrays, including pore arrays having selected pore diameters, depths, and distances relative to one another. The anode supports useful in this disclosure can have any number of possible porosities and/or void spaces associated therewith.

In the MEA, the catalyst dispersed on the cathode is capable of catalyzing halogen/halide redox reactions.

For the cathode in the MEA useful in this disclosure, the catalyst can include, for example, neat carbon powder or at least one catalyst selected from the group consisting of Ir, Ru, Pd, Pt, Mo, Re, and alloys thereof, mixed or deposited on carbon powder. In an embodiment, the catalyst compositions include, for example, (PtRe)/M, (PdRe)/M, and (PtM)/Ir, wherein M is a precious metal or a transition metal. Preferably, the catalyst includes PtRe, PdRe, Pt/Ir, Pd/Ir, Pt/Ru, (PtIr)/Ru, Ir/Ru, (PtRe)/Ir, and (PtRu)/Ir. The catalyst useful in this disclosure include those where the at least one precious metal is supported on carbon powder or ceramic powder.

For the cathode in the MEA useful in this disclosure, the support comprises a plurality of porous regions that define pore surfaces. The pore surfaces have catalyst dispersed thereon such that the catalyst is non-contiguously dispersed throughout the plurality of porous regions. The catalyst dispersed on the pore surfaces comprises a plurality of metallic particles. The plurality of porous regions are nanoporous (i.e., average pore size less than 2 nm), mesoporous (i.e., average pore size of 2 nm to 50 nm) and/or macroporous (i.e., average pore size greater than 50 nm).

The cathode support may have any number of pores and pore sizes such as, for example, random and ordered pore arrays, including pore arrays having selected pore diameters, depths, and distances relative to one another. The cathode supports useful in this disclosure can have any number of possible porosities and/or void spaces associated therewith.

In the regenerative fuel cell, the catalyst dispersed on the anode and the catalyst dispersed on the cathode are capable of catalyzing hydrogen redox reactions and halogen/halide redox reactions. Also, in the regenerative fuel cell, the catalyst dispersed on the anode and the catalyst dispersed on the cathode are capable of catalyzing a charging reaction and a discharging reaction in the regenerative fuel cell in the presence of an acid or a mixture of acids, or a halogen ion or a mixture of halogen ions.

Nanoporous-proton conducting membranes (NP-PCM) employed in the regenerative fuel cells useful in this disclosure allow water management which prevents porous electrodes from flooding. This makes such electrodes advantageous for use in the fuel cells useful in this disclosure.

Generally, single cells are combined into a fuel cell stack to produce the desired level of electrical power.

A hydrogen/bromine (tribromide) regenerative electrochemical cell is well suited for energy storage applications such as peak shaving, load management and other emerging distributed utility applications. A regenerative hydrogen/bromine cell facilitates electrical energy storage by consuming electricity in electrolyzing hydrogen bromide into hydrogen and tribromide and some bromine reactants as stored chemical energy. The hydrogen and tribromide are later reacted electrochemically in the cell to produce electrical energy. Hence, the cell is regenerative (reversible), in that it can efficiently operate as an electrolysis cell producing reactants and consuming electricity or a fuel cell consuming reactants and producing electricity. The cell exchanges electrical and chemical energy.

The hydrogen/tribromide regenerative electrochemical cell offers several advantages, for example, the hydrogen and bromine electrodes are fully reversible allowing very high electric-to-electric efficiencies. The same electrodes can be used as electrocatalysts for both chemical and electricity generation and therefore, the same cell can be used for both functions. The cell is capable of operating at a high current and high power density in both charging and discharging modes, resulting in lower capital costs. The reactants for chemical and electricity generation are stored separately from the cell which makes it cost effective for both peaking and load leveling (e.g., weekly cycle) and low cost capacity (kWh) increases.

The electrochemical reactions for the hydrogen/tribromide cycle take place in a charge mode and a discharge mode. During charge, hydrogen bromide is electrolyzed into hydrogen and tribromide (with minor amounts of bromine). These fluids are then stored separately outside the electrochemical cell. Since all reactants are stored external from the cell, independent sizing for power and energy storage becomes a distinct advantage. During discharge, the hydrogen and tribromide solution are delivered to the cell, where they react electrochemically to produce electric power and hydrogen bromide.

During charge (electrolysis), concentrated hydrobromic acid is electrolyzed and tribromide is formed at the positive electrode. Hydrated protons are transported across the membrane, and hydrogen gas is formed at the negative electrode. The hydrogen and tribromide that are formed during the charge mode are stored external to the cell, and they are fed back to the cell during the discharge (fuel cell) mode to produce electrical energy.

The quantity of tribromide species and minor amount of soluble free bromine available in the solution establishes the discharge capacity of the positive electrode in a hydrogen/tribromide fuel cell. A large mass of tribromide is ordinarily desirable in order to maximize the overall fuel cell capacity.

Nanoporous-proton conducting membranes (NP-PCM) employed in the fuel cells useful in this disclosure allow water management which prevents porous electrodes from flooding. This makes such electrodes advantageous for use in the fuel cells useful in this disclosure.

The fuels useful in the fuel cells useful in this disclosure are conventional materials and include, for example, hydrogen and alcohols. The oxidants useful in the fuel cells useful in this disclosure are conventional materials and include, for example, oxygen, bromine, chlorine and chlorine dioxide.

With regard to operating the energy storage system, power from the electrical energy source enters through one or more conduits to the power management system. When the regenerative fuel cell system operates in the fuel cell mode and provides electrical energy, fuel is fed from the fuel storage device to the regenerative fuel cell system via the fuel conduit. In the regenerative fuel cell system, the chemical energy of the fuel is converted to electrical energy, which is then supplied to the power management system. Optionally, all or part of the reactant product from the regenerative fuel cell system is transferred to the product storage device via the reactant product conduit. Products that are not stored are released.

When the regenerative fuel cell system operates in the electrolysis mode, electrical energy from the power management system is provided to the regenerative fuel cell system and the reactant product from the product storage device and/or from outside the electrochemical energy storage system is provided via the reactant product conduit to the regenerative fuel cell system. The fuel is regenerated in the regenerative fuel cell system and provided to the fuel storage via the fuel conduit.

Any suitable fuels, oxidizers and reactant product may be used. One preferred example for the fuel is hydrogen which is reacted with a halogen to produce a halogen acid reactant product. However, other fuels and oxidants can be used.

If surplus energy is available from the electrical energy source and an excess reactant product is supplied to the regenerative fuel cell system, then the system can generate more fuel than what is needed by the regenerative fuel cell system in the fuel cell mode. This excess fuel may be removed from the regenerative fuel cell system and provided for any suitable end use outside the system.

The energy storage system may also include a fuel removal device and a reactant product delivery device. Excess fuel is provided out of the energy storage system through the fuel removal device, while the excess reactant product is replenished through reactant product delivery device. The devices may comprise any suitable devices which may deliver fuel and reactant product.

For example, the fuel removal device may be a gas or liquid conduit such as a pipe or hose which delivers fuel, such as hydrogen, from the regenerative fuel cell system and/or from the fuel storage device outside the energy storage system. Alternatively, the device may comprise a movable gas or liquid storage container, such as a gas or liquid tank, which is physically removed from the energy storage system after the container is filled with fuel. If the device comprises a container, then the device may be used as both the fuel storage device while it remains in the energy storage system, and as a fuel removal device, when it is removed from the system.

The reactant product delivery device may be one or more gas or liquid conduits which deliver reactant product, such as halogen acid to the energy storage system. For example, the device may comprise a pipe or hose which delivers halogen acid to the product storage device or directly to the regenerative fuel cell system. The reactant product delivery device may comprise two conduits when the reactant product comprises two separate components. Alternatively, the reactant product delivery device may comprise a movable gas or liquid storage container, such as a gas or liquid tank, which is physically delivered to the system filled with reactant product. If the reactant product delivery device comprises a container, then the device may be used as both the reactant product storage device while it collects reactant product during the fuel cell mode, and as a reactant product delivery device when it provides reactant products during the electrolysis mode.

The reactant product delivery device is adapted to supply excess reactant product to the regenerative fuel cell system operating in the electrolysis mode, in addition to or instead of the reactant product generated by the regenerative fuel cell system in the fuel cell mode. In other words, the device supplies the reactant product in excess of the amount generated by the regenerative fuel cell system operating in the fuel cell mode.

The excess reactant product allows the regenerative fuel cell system to generate an amount of fuel in the electrolysis mode in excess of the amount of fuel required to operate the system in the fuel cell mode over a predetermined number of operating cycles. Thus, while anomalies, such as breakdowns, early shut downs, etc., may occur during individual fuel cell mode and electrolysis mode cycles, when the regenerative fuel cell system is operated cyclically over a predetermined number of such cycles, such as over 10 cycles, for example over 100 to 1,000 cycles, the system produces the excess fuel.

The regenerative fuel cell system may generate more fuel in the electrolysis mode than it consumes in the fuel cell mode over the predetermined number of cycles under several conditions. In an embodiment, the regenerative fuel cell system operates at a higher current level in the electrolysis mode than in the fuel cell mode over the predetermined number of cycles.

In an embodiment, the regenerative fuel cell system includes a PCM stack. It is desirable for the energy storage system to operate at high round-trip efficiencies, which is the ratio of energy provided to the electrical energy consumer to the electrical energy from source. In order to achieve high round-trip efficiencies, the PCM is preferably operated at comparably low current densities thereby minimizing losses in the PCM. Theoretically, the round-trip efficiency increases with decreasing current density. However, the PCM should be maintained at an elevated operating temperature, which typically ranges between 600° C. and 1000° C. The losses within the PCM can be used to provide make-up heat to keep the PCM at the desired temperature. If the current and thereby the losses become too small, the desired operating temperature cannot be maintained. Therefore, a practical low limit for the current density exists in the electrolysis mode and in the fuel cell mode. This current density limit depends on the thermal losses from the system and the heat generated at a specific current.

Operation of a fuel cell at low current implies a fuel cell voltage close to the open circuit voltage (OCV), which is the fuel cell voltage at zero current. Operation below OCV implies power generation, while operation above OCV implies fuel regeneration/electrolysis. When the fuel cell is operated in the electrolysis mode, additional constraints on the minimum allowable current density can exist. There is a minimum voltage for electrolysis, termed the thermal neutral voltage at which the electrolysis reaction is thermally neutral. In order to thermally sustain the PCM without the use of thermal storage during electrolysis, electrolysis should be performed above the thermal neutral voltage. On the other hand, power generation can be performed very close to OCV. As a result the desired minimum current density for electrolysis is significantly larger than the desired minimum current for power generation in the fuel cell mode. The difference between the minimum currents depends on the thermal management system and the choice of fuel and oxidizer. In a PCM without additional fuel generation, the current in power generation and electrolysis mode also should be balanced with respect to the available time for power generation and electrolysis. If, for example, energy is generated for 16 hours per day while fuel is regenerated for 8 hours per day, the current during regeneration has to be twice as large as the power generation current in order to balance fuel consumed and regenerated.

The two constraints for current densities outlined above generally lead to different values for the minimum current density in the fuel cell and electrolysis modes. As a result of the higher current density in the electrolysis than in fuel cell mode, the energy storage system typically has additional/unused fuel regeneration capacity. If additional or excess power or electrical energy and reactant product is available during fuel regeneration in the electrolysis mode, this excess fuel generation capacity can be utilized to generate additional fuel, which can be used outside the electrical energy storage system.

Thus, the energy storage system may be used as a regenerative power supply to remote residences or commercial operations or to residences or commercial operations connected to the power grid. The electrical power generator has to be sized to meet the peak load of the user. This sizing requirement allows a surplus of fuel to be generated during charge times. Examples include, but are not limited to, systems sized to meet high electrical power peak demands which occur during less than 100 percent of the system operation in the fuel cell mode or systems with relatively low energy consumption (i.e., below the maximum possible energy consumption) during the fuel cell mode.

Thus, in an embodiment, the regenerative fuel cell system is operated at a load lower than a peak load that the regenerative fuel cell system is capable of providing at least during a portion of a time that the regenerative fuel cell system operates in the fuel cell mode. Thus, the regenerative fuel cell system is operated for at least a portion of its fuel cell mode at a current density below its peak or maximum possible current density. In contrast, the regenerative fuel system is operated at a higher current density, such as at a peak current density, in the electrolysis mode to produce the excess fuel.

Since the energy storage system and regenerative fuel cell system are designed and sized for a desired energy storage, the size of the fuel cell stack and the size of the balance of plant are based on the desired energy storage. Thus, the size of the fuel cell stack is based on the minimum number of fuel cells that operate in the fuel cell mode to provide the desired peak power, rather than on the number of fuel cells that are required for the electrolysis mode. Thus, extra fuel cells or stacks may be required ensure that the energy storage system provides the desired peak power in the fuel cell mode during a worst case scenario. However, the energy generation capability of all of the fuel cells may not be used in the fuel cell mode outside of the worst case scenario. In contrast, the fuel regeneration capability of all fuel cells may be used during electrolysis mode to regenerate the fuel needed for future fuel cell mode(s) and to generate excess fuel for use outside the energy storage system.

In another embodiment, the regenerative fuel cell system is electrically connected to an electrical energy source which comprises a photovoltaic energy generation system which provides electrical energy to the regenerative fuel cell system during daytime to generate and store fuel. The photovoltaic energy generation system also provides electrical energy to the consumer. The regenerative fuel cell system generates electrical energy during night time from the stored fuel and provides this electrical energy to the consumer during night time. Often, the night time load on the regenerative fuel cell system is lower than a peak load that the regenerative fuel cell system is capable of providing, at least during a portion of the night time period. Thus, the regenerative fuel system is operated in the fuel cell mode during at least a portion of the night time period at a current density below its peak current density. In contrast, the regenerative fuel system is operated at a higher current density, such as at a peak current density, in the electrolysis mode during the day time period to produce the excess fuel.

In another embodiment, the regenerative fuel cell system operates for a longer duration in the electrolysis mode than in the fuel cell mode over the predetermined number of cycles. This difference in operating time may be used to produce the excess fuel. For example, the regenerative fuel cell system may operate during one portion of the electrolysis mode to regenerate sufficient fuel for the entire next fuel cell mode period, and then operate for the remainder of the electrolysis mode period to produce the excess fuel.

An example is where the regenerative fuel cell system is used to provide emergency backup power when the electrical energy source is unable to provide electrical energy to the consumer. For example, the regenerative fuel cell system may be used as a backup power source for a time when an electrical grid energy source stops providing electrical energy. In this example, the regenerative fuel cell system operates at least 90 to 99 percent of the time in the electrolysis mode and occasionally operates in the fuel cell mode when the energy source does not provide electrical energy. Thus, the regenerative fuel cell system is used as an electrolyzer which provides fuel for non-system uses and as an emergency backup power generator. This mode of operation reduces the cost of the emergency backup energy generation system.

If desired, the regenerative fuel cell system may operate in the electrolysis mode for a longer time period and at a higher current density than in the fuel cell mode.

In another embodiment, the regenerative fuel cell system is electrically connected an electrical energy source which comprises a renewable energy source. Any suitable renewable energy source may be used. An excess capacity of the renewable energy source is used to provide electrical energy to the regenerative fuel cell operating in the electrolysis mode to generate charged products and optionally excess fuel. Different renewable energy sources have different types of excess capacities.

In one example, the renewable energy source may comprise a photovoltaic system, such as a solar cell array. The photovoltaic system contains extra capacity during a first portion, such as the first 95 to 99.9 percent, of its designed lifespan. In other words, the capacity of the photovoltaic system decreases as the system ages during its life span. Thus, a photovoltaic system is often designed to provide a desired amount of electrical energy based on the remaining second portion of its expected lifespan, to prevent the photovoltaic system from providing an insufficient amount of electrical energy in the second portion of its expected life span. Therefore, the photovoltaic system is designed and sized to provide electrical energy in excess of that required by the consumer and that required by the regenerative fuel cell system to regenerate fuel for operation in the fuel cell mode. The excess capacity of the photovoltaic system during the first portion, such as the 95 to 99.9 percent, of its life span may be used to provide electrical energy to the regenerative fuel cell system to generate the excess fuel.

In another example, the photovoltaic system is designed and sized to provide a sufficient amount of electrical energy required by the consumer and required by the regenerative fuel cell system to regenerate fuel for operation in the fuel cell mode over a predetermined number of day and night cycles, even if a large amount of days are cloudy. In other words, the photovoltaic system is designed to provide a sufficient amount of electrical energy in a worst case weather scenario, such as when a predetermined percent of day time periods are cloudy. However, the worst case weather scenario occurs occasionally. Thus, when less than a predetermined percent of day time periods are cloudy, and the regenerative fuel cell system is fully recharged for operation in the next fuel cell mode period or periods, the photovoltaic system may be used to provide electrical energy to regenerative fuel cell system to generate excess fuel during the excess sunny portions of the day time periods. For example, the photovoltaic system is designed and sized to provide a sufficient amount of electrical energy required by the consumer and required by the regenerative fuel cell system in the winter, when the number of sunny days is at a minimum and/or when the day length is shortest compared to the night length. Thus, there is no sufficient sunlight during a predetermined percent of the time during winter. The photovoltaic system has excess capacity in the summer, when there is no sufficient sunlight during only a predetermined percent of the time. The photovoltaic system may be used to provide electrical energy to regenerative fuel cell system to generate excess fuel during a predetermined percent of the time during the summer.

In another example, the renewable energy source may comprise a wind turbine system which is designed to provide a minimum amount of electrical energy at a predetermined wind speed. Such systems often contain rotatable blades coupled to a generator which generates electricity when the wind rotates the blades. This system contains extra capacity during periods when the wind speed exceeds a predetermined wind speed.

The wind turbine system is designed and sized to provide a sufficient amount of electrical energy required by the consumer and required by the regenerative fuel cell system to regenerate fuel for operation in the fuel cell mode over a predetermined number of cycles, even if a there is no wind or the wind speed is low during a large portion of a predetermined number of cycles. In other words, the wind turbine system is designed to provide a sufficient amount of electrical energy in a worst case weather scenario, such as when a predetermined percent of the time there is no wind or the wind speed is lower than desirable. However, the worst case weather scenario occurs occasionally. Thus, when less than a predetermined percent of the time period has little or no wind and the regenerative fuel cell system is fully recharged for operation in the next fuel cell mode period or periods, the wind turbine system may be used to provide electrical energy to regenerative fuel cell system to generate excess fuel during the excess windy portions of the time period. For example, if a predetermined percent of the time period has no wind or insufficient wind, then the wind turbine system may be used to provide electrical energy to regenerative fuel cell system to generate excess fuel during a predetermined percent of time period.

In another example, the renewable energy source may comprise a tidal energy generation system which is designed to provide a minimum amount of electrical energy at a predetermined tidal force. Such a system contains movable members, such as plates, located under a body of water, such as a sea, ocean or lake. The movable members are connected to a generator. The movable members are moved by the tides and the movement causes the generator to generate electricity. This system contains extra capacity during periods when the tidal force exceeds the predetermined tidal force.

The tidal energy generation system is designed and sized to provide a sufficient amount of electrical energy required by the consumer and required by the regenerative fuel cell system to regenerate fuel for operation in the fuel cell mode over a predetermined number of cycles, even if a there is no tide or the tidal force is low during a large portion of a predetermined number of cycles. In other words, the tidal energy generation system is designed to provide a sufficient amount of electrical energy in a worst case tidal scenario, such as when a predetermined percent of the time the tidal force is lower than desirable. However, the worst case tidal scenario occurs occasionally. Thus, when less than a predetermined percent of the time period has insufficient tidal force and the regenerative fuel cell system is fully recharged for operation in the next fuel cell mode period or periods, the tidal energy generation system may be used to provide electrical energy to regenerative fuel cell system to generate excess fuel during the excess high tidal force portions of the time period. For example, if a predetermined percent of the time period has insufficient tidal force, then the tidal energy generation system may be used to provide electrical energy to regenerative fuel cell system to generate excess fuel during a predetermined percent of time period.

In another example, the renewable energy source may comprise a geothermal energy generation system which is designed to provide a minimum amount of electrical energy at a predetermined geothermal energy. Such a geothermal energy generation system uses the heat and/or steam emitted from the earth and converts the heat and/or steam into electrical energy. This system contains extra capacity during periods when the geothermal energy exceeds a predetermined, worst case thermal energy supply scenario. For example, ambient losses for the geothermal energy differ between warm summer ambient temperatures and cold winter ambient temperatures.

Thus, co-production of fuel in an energy storage device using a fuel regenerating device can be realized in any situation where the fuel consumed during discharge is less than the fuel regenerated during charging periods, preferably over a predetermined number of charge and discharge cycles. The regenerative fuel cell system generates fuel during the entire electrolysis mode time period. From about 1 to about 99 percent of the generated fuel, such as about 10 to about 30 percent of the generated fuel is excess fuel which may be used for non-energy storage system uses, while the remaining fuel may be used to operate the regenerative fuel cell system in the fuel cell mode.

The energy storage system may be used with a renewable energy source in remote locations that are not connected to the power grid. In this case, the regenerative fuel cell system of the electrical energy storage system may be used to generate fuel for air, land or water vehicles. A vehicle fuel infrastructure is not required in this case and the energy storage system may be used to supply the necessary fuel to power the vehicles at the remote location. For example, the vehicles may be powered by hydrogen. Furthermore, since the regenerative fuel cell system may be used to generate electricity and an environmentally clean fuel, such as hydrogen, without emission of greenhouse gases and carbon dioxide, the regenerative fuel cell system improves the environment and reduces the emission of greenhouse gases for transportation and other uses.

The excess generated fuel may be used for any suitable application outside the energy storage system. For example, the excess fuel may be provided to power an airborne vehicle such as a rocket, airplane, helicopter or blimp, a water based vehicle such as a ship or submarine, a land based vehicle such as a car, truck, motorcycle, tank or train, a chemical reaction in a chemical manufacturing process such as a semiconductor manufacturing or chemical production process, or a heating system of a building such as a commercial building, including office buildings, factories and hospitals and residential buildings.

Various modifications and variations of this disclosure will be obvious to a worker skilled in the art and it is to be understood that such modifications and variations are to be included within the purview of this application and the spirit and scope of the claims.

What is claimed is:

1. An electrochemical system comprising:
    (a) an energy storage system comprising a regenerative fuel cell system which generates electrical energy and reactant product from fuel and oxidizer in a fuel cell mode, and which generates the fuel and oxidant from the reactant product and electrical energy in an electrolysis mode; at least one fuel storage vessel in fluid communication with said regenerative fuel cell system; and at least one reactant product storage vessel in fluid communication with said regenerative fuel cell system;
    wherein the regenerative fuel cell system comprises one or more stacks of regenerative fuel cells, an electrolyte feed inlet connected to one or more stacks of regenerative fuel cells, an electrolyte feed line extending from the electrolyte feed inlet to at least one electrolyte holding vessel, an electrolyte discharge outlet connected to one or more stacks of regenerative fuel cells and a electrolyte discharge line extending from the electrolyte discharge outlet to the at least one electrolyte holding vessel;
    wherein at least a portion of the electrolyte feed line adjacent to the electrolyte feed inlet has a coiled configuration, and at least a portion of the electrolyte discharge line adjacent to the electrolyte discharge outlet opening has a coiled configuration;
    said regenerative fuel cells comprising a housing; a nanoporous proton conducting membrane having a first surface and a second surface, disposed in said housing to partition it into an anode side and a cathode side; an anode formed on said first surface so as to connect said first surface to the anode side; a cathode formed on said second surface so as to connect said second surface to the cathode side; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cells; and
    an energy source electrically connected to the regenerative fuel cell system to provide electrical energy to the regenerative fuel cell system operating in the electrolysis mode; or (b) a regenerative fuel cell system which generates electrical energy and reactant product from fuel and oxidizer in a fuel cell mode, and which generates the fuel and oxidant from the reactant product and electrical energy in an electrolysis mode;

wherein the regenerative fuel cell system comprises one or more stacks of regenerative fuel cells, an electrolyte feed inlet connected to one or more stacks of regenerative fuel cells, an electrolyte feed line extending from the electrolyte feed inlet to at least one electrolyte holding vessel, an electrolyte discharge outlet connected to one or more stacks of regenerative fuel cells and an electrolyte discharge line extending from the electrolyte discharge outlet to the at least one electrolyte holding vessel;

wherein at least a portion of the electrolyte feed line adjacent to the electrolyte feed inlet has a coiled configuration, and at least a portion of the electrolyte discharge line adjacent to the electrolyte discharge outlet opening has a coiled configuration;

said regenerative fuel cells comprising a housing; a nanoporous proton conducting membrane having a first surface and a second surface, disposed in said housing to partition it into an anode side and a cathode side; an anode formed on said first surface so as to connect said first surface to the anode side; a cathode formed on said second surface so as to connect said second surface to the cathode side; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cells;

a reactant product delivery or storage device in fluid communication with said regenerative fuel cell system; the reactant product delivery device providing excess reactant product to the regenerative fuel cell system operating in the electrolysis mode, in addition to or instead of the reactant product generated by the regenerative fuel cell system in the fuel cell mode, such that fuel in excess of fuel required to operate the regenerative fuel cell system in the fuel cell mode is generated in the electrolysis mode; the reactant product storage device storing excess reactant product to be provided to the regenerative fuel cell system operating in the electrolysis mode, in addition to the reactant product generated by the regenerative fuel cell system operating in the fuel cell mode; and a product/fuel storage device in fluid communication with said regenerative fuel cell system; the product/fuel storage device storing products and excess fuel from the charging reaction in electrolysis mode and the discharging reaction in fuel cell mode.

2. The electrochemical system of claim 1 wherein the energy source is selected from an electrical grid, an electrical generator, or a renewable energy source; wherein the renewable energy source selected from a photovoltaic power source, a solar power source, or a wind power source.

3. The electrochemical system of claim 1 wherein the regenerative fuel cell system is electrically connected to a renewable energy source for generating renewable electrical energy and for using excess capacity to provide electrical energy to the regenerative fuel cell system operating in the electrolysis mode to generate charged products.

4. The electrochemical system of claim 1 wherein the regenerative fuel cell system is (i) electrically connected to an energy source comprising a solar energy source for generating electrical energy from sun light, providing the electrical energy to the regenerative fuel cell system during daytime periods to generate charged products, and allowing the regenerative fuel cell system to generate electrical energy during night time periods; or (ii) electrically connected to an energy source comprising a wind energy source for generating electrical energy from wind, providing the electrical energy to the regenerative fuel cell system during periods when wind speed exceeds a predetermined wind speed to generate charged products, and allowing the regenerative fuel cell system to generate electrical energy during periods when wind speed does not exceed a predetermined wind speed.

5. The electrochemical system of claim 1 wherein the regenerative fuel cell system comprises:
(i) one or more stacks of regenerative fuel cells comprising a solution or electrolyte compartment, a gas compartment and a membrane electrode assembly (MEA) disposed between said solution or electrolyte compartment and said gas compartment; wherein said membrane electrode assembly (MEA) comprises an anode, a cathode and a nanoporous proton conducting membrane disposed between said anode and said cathode; said anode facing the gas compartment and said cathode facing the solution or electrolyte compartment; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cell; or
(ii) one or more stacks of regenerative fuel cells comprising an anode, a cathode and a nanoporous proton conducting membrane disposed between said anode and said cathode; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a reaction between a fuel and an oxidant to generate an electric current.

6. The electrochemical system of claim 1 wherein the reactant product comprises a halogen acid, a mixture of halogen acids, an iron salt and conjugated acid thereof, or a mixture of iron salts and conjugated acids thereof; and a gas comprises hydrogen.

7. The electrochemical system of claim 1 wherein the nanoporous proton conducting membrane comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution.

8. The electrochemical system of claim 1 wherein, for the anode comprising a support and a catalyst dispersed thereon, the catalyst comprises at least one precious metal; and, for the cathode comprising a support and a catalyst dispersed thereon, the catalyst comprises carbon powder or at least one precious metal with carbon powder.

9. The electrochemical system of claim 1 wherein the regenerative fuel cells comprise hydrogen/bromine (tribromide) regenerative fuel cells.

10. A method of operating an electrochemical system containing a regenerative fuel cell system, said method comprising:
(a) providing an energy storage system comprising a regenerative fuel cell system which generates electrical energy and reactant product from fuel and oxidizer in a fuel cell mode, and which generates the fuel and oxidant from the reactant product and electrical energy in an electrolysis mode; at least one fuel storage vessel in fluid communication with said regenerative fuel cell system; and at least one reactant product storage vessel in fluid communication with said regenerative fuel cell system;
cyclically operating the regenerative fuel cell system in a fuel cell mode to generate electrical energy and reactant product from fuel and oxidizer and in an electrolysis mode to generate the fuel and oxidant from the reactant product and electrical energy;
wherein the regenerative fuel cell system comprises one or more stacks of regenerative fuel cells, an electrolyte feed inlet connected to one or more stacks of regenerative fuel cells, an electrolyte feed line extending from the electrolyte feed inlet to at least one electrolyte holding vessel, an electrolyte discharge outlet connected to one or more stacks of regenerative fuel cells and an electrolyte discharge line extending from the electrolyte discharge outlet to the at least one electrolyte holding vessel;
wherein at least a portion of the electrolyte feed line adjacent to the electrolyte feed inlet has a coiled configuration, and at least a portion of the electrolyte discharge line adjacent to the electrolyte discharge outlet opening has a coiled configuration;
said regenerative fuel cells comprising a housing; a nanoporous proton conducting membrane having a first surface and a second surface, disposed in said housing to partition it into an anode side and a cathode side; an anode formed on said first surface so as to connect said first surface to the anode side; a cathode formed on said second surface so as to connect said second surface to the cathode side; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cells; and
providing electrical energy, from an energy source electrically connected to the regenerative fuel cell system, to the regenerative fuel cell system operating in the electrolysis mode; or
(b) cyclically operating the regenerative fuel cell system in a fuel cell mode to generate electrical energy and reactant product from fuel and oxidizer and in an electrolysis mode to generate the fuel and oxidant from the reactant product and electrical energy;
wherein the regenerative fuel cell system comprises one or more stacks of regenerative fuel cells, an electrolyte feed inlet connected to one or more stacks of regenerative fuel cells, an electrolyte feed line extending from the electrolyte feed inlet to at least one electrolyte holding vessel, an electrolyte discharge outlet connected to one or more stacks of regenerative fuel cells and an electrolyte discharge line extending from the electrolyte discharge outlet to the at least one electrolyte holding vessel;
wherein at least a portion of the electrolyte feed line adjacent to the electrolyte feed inlet has a coiled configuration, and at least a portion of the electrolyte discharge line adjacent to the electrolyte discharge outlet opening has a coiled configuration;
said regenerative fuel cells comprising a housing; a nanoporous proton conducting membrane having a first surface and a second surface, disposed in said housing to partition it into an anode side and a cathode side; an anode formed on said first surface so as to connect said first surface to the anode side; a cathode formed on said second surface so as to connect said second surface to the cathode side; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cells;
providing excess reactant product to the regenerative fuel cell system operating in the electrolysis mode, in addition to or instead of the reactant product generated by the regenerative fuel cell system in the fuel cell mode, such that fuel in excess of fuel required to operate the regenerative fuel cell system in the fuel cell mode is generated in the electrolysis mode; and
storing products and excess fuel from the charging reaction in electrolysis mode and the discharging reaction in fuel cell mode.

11. The method of claim 10 further comprising (i) using an excess capacity of an energy source electrically connected to the regenerative fuel cell system, to provide electrical energy to the regenerative fuel cell system operating in the electrolysis mode to generate charged products; or (ii) storing excess reactant product to be provided to the regenerative fuel cell system operating in the electrolysis mode, in addition to the reactant product generated by the regenerative fuel cell system operating in the fuel cell mode.

12. The method of claim 10 wherein the regenerative fuel cell system (i) generates more charged products in the electrolysis mode than it consumes in the fuel cell mode over a predetermined number of cycles; (ii) operates at a higher current level in the electrolysis mode than in the fuel cell mode over a predetermined number of cycles; or (iii) operates for a longer duration in the electrolysis mode than in the fuel cell mode over a predetermined number of cycles.

13. The method of claim 10 wherein the regenerative fuel cell system is operated at a load lower than a peak load that the regenerative fuel cell system is capable of providing at least during a portion of a time that the regenerative fuel cell system operates in the fuel cell mode.

14. The method of claim 10 wherein the regenerative fuel cell system is electrically connected to an energy source comprising a renewable energy source, such that an excess capacity of the renewable energy source is used to provide electrical energy to the regenerative fuel cell operating in the electrolysis mode to generate charged products.

15. The method of claim 10 wherein the regenerative fuel cell system is (i) electrically connected to an energy source comprising a photovoltaic energy generation system which provides electrical energy to the regenerative fuel cell system during daytime to generate charged products, and the regenerative fuel cell system generates electrical energy during night time; or (ii) electrically connected to an energy source comprising a wind energy generation system which provides electrical energy to the regenerative fuel cell system during periods when the wind speed exceeds the predetermined minimum wind speed to generate charged products, and the regenerative fuel cell system generates electrical energy during periods when the wind speed does not exceed the predetermined minimum wind speed.

16. The method of claim 10 wherein the regenerative fuel cell system comprises:
  (i) one or more stacks of regenerative fuel cells comprising a solution or electrolyte compartment, a gas compartment and a membrane electrode assembly (MEA) disposed between said solution or electrolyte compartment and said gas compartment; wherein said membrane electrode assembly (MEA) comprises an anode, a cathode and a nanoporous proton conducting membrane disposed between said anode and said cathode; said anode facing the gas compartment and said cathode facing the solution or electrolyte compartment; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a charging reaction in electrolysis mode and a discharging reaction in fuel cell mode in said regenerative fuel cell; or
  (ii) one or more stacks of regenerative fuel cells comprising an anode, a cathode and a nanoporous proton conducting membrane disposed between said anode and said cathode; said anode comprising a support and a catalyst dispersed thereon; said cathode comprising a support, or a support and a catalyst dispersed thereon; wherein the catalyst dispersed on said anode and the catalyst dispersed on said cathode are the same or different and are capable of catalyzing, in the presence of an acid or a mixture of acids, or a halogen ion or a mixture of halogen ions, a reaction between a fuel and an oxidant to generate an electric current.

17. The method of claim 10 wherein the reactant product comprises a halogen acid, a mixture of halogen acids, an iron salt and conjugated acid thereof, or a mixture of iron salts and conjugated acids thereof, and the gas comprises hydrogen.

18. The method of claim 10 wherein the nanoporous proton conducting membrane comprises: (i) 5% to 60% by volume of an electrically nonconductive inorganic powder having acid absorption capacity, wherein the powder comprising essentially nanosize particles; (ii) 5% to 50% by volume of a polymeric binder that is chemically compatible with acid, oxygen and fuel; and (iii) 10 to 90% by volume of an acid or aqueous acid solution.

19. The method of claim 10 wherein, for the anode comprising a support and a catalyst dispersed thereon, the catalyst comprises at least one precious metal; and, for the cathode comprising a support, or a support and a catalyst dispersed thereon, the catalyst comprises carbon powder or at least one precious metal with carbon powder.

20. The method of claim 10 wherein the regenerative fuel cells comprise hydrogen/bromine (tribromide) regenerative fuel cells.

\* \* \* \* \*